(12) United States Patent
Einhorn et al.

(10) Patent No.: US 8,070,186 B2
(45) Date of Patent: Dec. 6, 2011

(54) PRINTABLE REFLECTIVE FEATURES FORMED FROM MULTIPLE INKS AND PROCESSES FOR MAKING THEM

(75) Inventors: Richard A. Einhorn, Albuquerque, NM (US); Mark J. Hampden-Smith, Albuquerque, NM (US); Scott T. Haubrich, Albuquerque, NM (US); Rimple Bhatia, Placitas, NM (US)

(73) Assignee: Cabot Corporation, Boston, MA (US)

( * ) Notice: Subject to any disclaimer, the term of this patent is extended or adjusted under 35 U.S.C. 154(b) by 1162 days.

(21) Appl. No.: 11/443,248

(22) Filed: May 31, 2006

(65) Prior Publication Data

US 2007/0278422 A1    Dec. 6, 2007

(51) Int. Cl.
*B42D 15/00* (2006.01)
(52) U.S. Cl. ............... 283/94; 283/57; 283/72; 283/81; 283/89; 283/107
(58) Field of Classification Search .............. 283/57, 283/72, 81, 82, 89, 94, 107, 109, 117, 901, 283/92, 902
See application file for complete search history.

(56) References Cited

U.S. PATENT DOCUMENTS

| | | |
|---|---|---|
| 4,428,997 A | 1/1984 | Shulman |
| 4,434,010 A | 2/1984 | Ash |
| 4,504,084 A | 3/1985 | Jauch |
| 4,539,041 A | 9/1985 | Figlarz et al. |
| 4,705,356 A | 11/1987 | Berning et al. |
| 4,779,898 A | 10/1988 | Berning et al. |
| 5,059,245 A | 10/1991 | Phillips et al. |
| 5,278,590 A | 1/1994 | Phillips et al. |
| 5,304,587 A | 4/1994 | Oswald et al. |
| 5,324,567 A | 6/1994 | Bratchley et al. |
| 5,498,283 A | 3/1996 | Botros et al. |
| 5,569,535 A | 10/1996 | Phillips et al. |
| 5,714,231 A | 2/1998 | Reinhart |
| 5,718,754 A | 2/1998 | Macpherson et al. |
| 5,720,801 A | 2/1998 | Nadan et al. |
| 5,766,738 A | 6/1998 | Phillips et al. |
| 5,834,096 A | 11/1998 | Waitts |
| 5,853,464 A | 12/1998 | Macpherson et al. |
| 5,889,083 A | 3/1999 | Zhu |
| 5,944,881 A | 8/1999 | Mehta et al. |
| 5,980,593 A | 11/1999 | Friswell et al. |
| 6,013,307 A | 1/2000 | Hauser et al. |

(Continued)

FOREIGN PATENT DOCUMENTS

DE    4432062 C1    11/1995

(Continued)

OTHER PUBLICATIONS

U.S. Appl. No. 11/331,230.

(Continued)

*Primary Examiner* — Dana Ross
*Assistant Examiner* — Justin Lewis

(57) ABSTRACT

The invention relates to reflective features formed from multiple inks. In one embodiment, the reflective feature includes a substrate having a first region and a second region, the first and second regions having different surface characteristics; a first reflective element disposed on the first region; and a second reflective element disposed on the second region, wherein the first reflective element is more adherent than the second reflective element to the first region. In another embodiment, the reflective feature includes multiple layers formed from different inks exhibiting enhanced reflectivity and/or durability. The invention is also to processes for forming these features, preferably through a direct write printing process.

49 Claims, 4 Drawing Sheets

U.S. PATENT DOCUMENTS

| | | | |
|---|---|---|---|
| 6,114,018 A | 9/2000 | Phillips et al. | |
| 6,210,777 B1 * | 4/2001 | Vermeulen et al. | 428/195.1 |
| 6,712,894 B2 | 3/2004 | Shepard | |
| 6,903,850 B2 | 6/2005 | Kay et al. | |
| 6,905,755 B1 | 6/2005 | Nemeth | |
| 6,937,752 B2 | 8/2005 | Chiba et al. | |
| 6,938,013 B1 | 8/2005 | Gutierrez-Sheris | |
| 6,972,138 B2 | 12/2005 | Heinrich et al. | |
| 6,979,499 B2 | 12/2005 | Walck et al. | |
| 7,199,911 B2 | 4/2007 | Hudson et al. | |
| 2003/0179364 A1 * | 9/2003 | Steenblik et al. | 356/71 |
| 2004/0182533 A1 | 9/2004 | Blum et al. | |
| 2004/0233463 A1 | 11/2004 | Hersch | |
| 2005/0064157 A1 | 3/2005 | Okazawa et al. | |
| 2005/0078158 A1 | 4/2005 | Magdassi | |
| 2005/0112360 A1 * | 5/2005 | Berger et al. | 428/323 |
| 2005/0170259 A1 | 8/2005 | Holmes | |
| 2005/0192888 A1 | 9/2005 | Lennane et al. | |
| 2005/0258637 A1 | 11/2005 | Bi et al. | |
| 2005/0271566 A1 | 12/2005 | Yadav | |
| 2005/0284366 A1 | 12/2005 | Anderson et al. | |
| 2006/0083694 A1 | 4/2006 | Kodas et al. | |
| 2006/0159603 A1 | 7/2006 | Vanheusden et al. | |
| 2006/0159838 A1 | 7/2006 | Kowalski et al. | |
| 2006/0160373 A1 | 7/2006 | Kowalski et al. | |
| 2006/0162497 A1 | 7/2006 | Kodas et al. | |
| 2006/0166057 A1 | 7/2006 | Kodas et al. | |
| 2006/0189113 A1 | 8/2006 | Vanheusden et al. | |
| 2007/0190298 A1 | 8/2007 | Hampden-Smith et al. | |
| 2008/0043085 A1 | 2/2008 | Einhorn et al. | |

FOREIGN PATENT DOCUMENTS

| | | |
|---|---|---|
| EP | 0439092 A2 | 7/1991 |
| EP | 1132450 A2 | 9/2001 |
| EP | 1335217 A2 | 8/2003 |
| EP | 1407824 A1 | 4/2004 |
| EP | 1422070 A1 | 5/2004 |
| EP | 1299250 B1 | 4/2005 |
| EP | 1609441 A1 | 12/2005 |
| EP | 1457349 A1 | 9/2008 |
| WO | WO 90/08046 | 7/1990 |
| WO | WO 00/24580 | 5/2000 |
| WO | 2003/038002 A1 | 5/2003 |
| WO | 2004014663 A1 | 2/2004 |
| WO | 2004/048120 A1 | 6/2004 |
| WO | WO 2005/070693 A1 | 8/2005 |
| WO | WO 2005/080089 A1 | 9/2005 |
| WO | WO 2005/123272 A2 | 12/2005 |
| WO | WO 2006/052500 A2 | 5/2006 |

OTHER PUBLICATIONS

U.S. Appl. No. 11/331,233.

U.S. Appl. No. 11/588,030.

C&EN: Cover Story—Rainbow in a Can, CENEAR vol. 81, No. 44, pp. 25-27 (Nov. 3, 2003) (ISSN 0009-2347).

Smith, H., High Performance Pigments, Wiley-VCH Verlag-GmbH, Weinheim, Germany (2002).

Silvert, P.-Y. et al., "Preparation of colloidal silver dispersions by the polyol process" Part 1—Synthesis and characterization, *J. Mater. Chem.*, (1996), 6(4). pp. 573-577, Part 2—Mechanism of particle formation, *J. Mater Chem.*, (1997), 7(2), pp. 293-299.

Pond, S., "Inkjet Technology and Product Development Strategies," *Torrey Pines Research* (2000), pp. 115-122.

van Renesse, R., *Optical Document Security*, 3rd Edition, ARTECH House (ISBN 1-58053-6), Sections 4.2.6, 6.12, 7.1.3.

International Search Report and Written Opinion for PCT/US2007/070162 dated Mar. 14, 2008 (15 pages).

* cited by examiner

PRINTABLE REFLECTIVE FEATURES FORMED FROM MULTIPLE INKS AND PROCESSES FOR MAKING THEM

FIELD OF THE INVENTION

The present invention relates to reflective features and to processes for making reflective features. In particular, the invention relates to reflective features formed on substrates having regions with different surface characteristics, to multi-layered features having high reflectivity and durability, and to processes for making such features.

BACKGROUND OF THE INVENTION

Recent advances in color copying and printing have put increasing importance on developing new methods to prevent forgery of security documents such as banknotes. While there have been many techniques developed, one area of increasing interest is in developing reflective features that cannot be readily reproduced, particularly by a color copier or printer.

One approach that has been taken is to formulate an ink for creating a printed image that is visually distinct from its reproduction. For example, U.S. Pat. Nos. 5,059,245, 5,569,535, and 4,434,010, the entireties of which are incorporated herein by reference, describe the use of stacked thin film platelets or flakes. Images produced with these pigments exhibit angular metamerism. These pigments have been incorporated into security inks used, for example, in paper currency. These pigments have also been incorporated into plastics applications (see, for example, PCT Publication WO 00/24580, published May 4, 2000). Additional inks and reflective features are described in U.S. Pat. Nos. 4,705,356; 4,779,898; 5,278,590; 5,766,738; and 6,114,018, the entireties of which are incorporated herein by reference.

Another approach used to produce security documents has been to produce a "covert" image that contains a material which cannot be seen by the naked eye but which can be made visible under specific conditions. For example, U.S. Pat. Nos. 5,324,567, 5,718,754, and 5,853,464 disclose the use of Raman active compounds. U.S. Pat. Nos. 5,944,881 and 5,980,593 describe fluorescent materials that can be used in an ink. Also, U.S. Pat. No. 4,504,084 discloses a document containing an information marking comprised of a first color that is at least partially opaque or visible in infrared light and a second color, which conceals the first color in the visible spectrum, but is invisible to infrared light.

While these efforts afford printed images that are difficult to reproduce, advances in color copiers and color printers continue to be made. Therefore, the need exists for new highly secure features and for methods for producing such features, particularly for security documents, which features cannot be easily reproduced, and which are visually distinct from their reproductions.

Additionally, the need exists for providing the ability to create reflective features that display variable information, e.g., information that is individualized for a specific product unit, such as a serial number, which variable information cannot be easily or readily duplicated or copied.

The need also exists for reflective features that are highly reflective. Highly reflective features, particularly reflective features that display variable information, are generally more difficult to reproduce than non-reflective features.

The need also exists for highly durable reflective features that can withstand the rigors of use, for example, the extensive handling involved with widespread circulation, or the repeated washing to which authenticated garments may be subject.

SUMMARY OF THE INVENTION

In a first embodiment, the invention is to a reflective feature, comprising: (a) a substrate having a first region and a second region, the first and second regions having different surface characteristics; (b) a first reflective element, preferably comprising metallic nanoparticles, disposed on the first region; and (c) a second reflective element, preferably comprising metallic nanoparticles, disposed on the second region, wherein the first reflective element is more adherent than the second reflective element to the first region. Preferably, the second reflective element is more adherent than the first reflective element to the second region.

Optionally, the first reflective element is disposed exclusively on the first region. The substrate may further comprise a third region, and the reflective feature further comprises a third reflective element disposed on the third region, wherein the third reflective element is more adherent than the first reflective element or the second reflective element to the third region.

The first region and/or the second region optionally comprises a composition selected from the group consisting of foil, film, UV-coated lacquer, paper, coated paper, polymer, and printed paper.

The first reflective element and the second reflective element optionally form a continuous graphical feature that spans at least a part of the first region and at least a part of the second region.

In a preferred embodiment, at least one of the first reflective element and/or the second reflective element comprises variable information.

The substrate optionally is selected from the group consisting of a banknote, a brand authentication tag, a tax stamp, an ID document, an alcoholic bottle, and a tobacco product.

In one embodiment, the first region comprises a first undercoat. In this embodiment, the first reflective element optionally exhibits enhanced reflectivity relative to the reflectivity of the first reflective element on the first region in the absence of the first undercoat. Additionally, the second region optionally comprises a second undercoat. In this embodiment, the second reflective element optionally exhibits enhanced reflectivity relative to the reflectivity of the second reflective element on the second region in the absence of the second undercoat.

In one embodiment, the feature further comprises a first overcoat disposed on the first reflective element. In this embodiment, the first reflective element optionally exhibits enhanced reflectivity relative to the reflectivity of the first reflective element without the first overcoat. Also, in this embodiment, the first reflective element optionally exhibits enhanced durability relative to the durability of the first reflective element without the first overcoat. The first overcoat may further be disposed on the second reflective element. In this embodiment, the second reflective element optionally exhibits enhanced reflectivity relative to the reflectivity of the second reflective element without the first overcoat. Also, in this embodiment, the second reflective element optionally exhibits enhanced durability relative to the durability of the second reflective element without the first overcoat. In another aspect, the feature further comprises a second overcoat disposed on the second reflective element, wherein the second reflective element optionally exhibits enhanced reflectivity relative to the reflectivity of the second reflective element without the second overcoat. Also, in this embodiment, the second reflective element optionally exhibits enhanced durability relative to the durability of the second reflective element without the second overcoat.

Optionally, the first region is more or less porous than the second region. In another embodiment, the first region is more or less hydrophobic than the second region.

In another embodiment, the present invention is directed to a process for forming a reflective feature, the process comprising the steps of: (a) providing a substrate comprising a first region and a second region; (b) direct write printing, e.g., piezo-electric, thermal, drop-on-demand, or continuous ink jet printing, a first ink onto the first region to form a first reflective element; and (c) direct write printing a second ink onto the second region to form a second reflective element, wherein the first ink is more adherent than the second ink to the first region. Preferably, the second ink is more adherent than the first ink to the second region. At least one of the first ink and the second ink preferably comprises metallic nanoparticles. This process may be employed, for example, to form the above-described reflective feature.

Optionally, the process further comprises the step of direct write printing a third ink onto a third substrate surface to form a third reflective element, wherein the substrate further comprises the third substrate surface, and wherein the third ink is more adherent than the first ink or the second ink to the third region.

In another embodiment, the invention is to a reflective feature, comprising: (a) a substrate having a first surface; (b) a first coating disposed on the first surface and having a second surface; and (c) a reflective element having a third surface and comprising nanoparticles disposed, at least in part, on the second surface.

Optionally, the feature further comprises a second coating, which optionally is transparent, having a fourth surface disposed, at least in part, on the third surface. The second coating optionally comprises a material selected from the group consisting of: a varnish, an offset varnish, a dry offset varnish, a shellac, latex, and a polymer.

In this embodiment, the first surface optionally comprises two regions having different surface characteristics, and the first coating covers at least a portion of both regions, and the reflective element optionally covers at least a portion of the two regions.

Optionally, the first coating comprises a material selected from the group consisting of varnishes, offset varnishes, dry offset varnishes, shellacs, and polymers. In one aspect, the first coating further comprises a colorant.

The nanoparticles optionally comprise phosphorescent nanoparticles. In another embodiment, the nanoparticles comprise metallic nanoparticles. In this embodiment, a majority of the metallic nanoparticles optionally are necked with at least one adjacent metallic nanoparticle. The metallic nanoparticles optionally comprise a metal selected from the group consisting of silver, gold, zinc, tin, copper, platinum and palladium, and alloys thereof. The metallic nanoparticles may have an average particle size of less than about 200 nm, e.g., an average particle size of from about 50 nm to about 100 nm.

The reflective element optionally comprises a reflective layer that is at least partially semitransparent. The reflective element optionally comprises a continuous reflective layer or a non-continuous reflective layer. Preferably, the reflective feature is more reflective than it would be in the absence of the first coating.

In one aspect, at least one of the first surface or the second surface has an image disposed thereon, and at least a portion of the image is viewable through the reflective element when viewed at a first angle relative to the third surface, and the least a portion of the image is at least partially obscured when viewed from a second angle relative to the third surface. The second angle may, for example, be about 180° minus the angle of incident light, relative to the third surface. The image optionally is formed from a printing process selected from the group consisting of direct write printing, intaglio printing, gravure printing, lithographic printing and flexographic printing processes. The image may be selected from the group consisting of a hologram, a black and white image, a color image, a watermark, a UV fluorescent image, text and a serial number.

In one embodiment, the reflective element comprises a plurality of reflective images. Optionally, the reflective element comprises a plurality of reflective microimages, wherein the plurality of reflective microimages has an average largest dimension of less than about 0.5 mm. At least one microimage optionally comprises variable data.

In another embodiment, the invention is to a process for forming a reflective feature, the process comprising the steps of: (a) providing a substrate having a first surface; (b) forming a first coating on the first surface, the first coating having a second surface; and (c) forming a reflective element on the second surface, the reflective element having a third surface and comprising nanoparticles. This process may be employed, for example, to form the above-described multi-layer reflective feature.

In this embodiment, the first surface optionally comprises two regions having different surface characteristics, and the first coating covers at least a portion of both regions, and reflective element optionally covers at least a portion of the two regions. Step (b) optionally comprises depositing a first ink onto the first surface and treating the deposited first ink under conditions effective to form the first coating. The depositing preferably comprises direct write printing the first ink onto the first surface. The treating optionally comprises one or more of: drying the deposited first ink, heating the deposited first ink, and/or applying UV radiation to the deposited first ink. Step (c) optionally comprises depositing a second ink onto the second surface and treating the deposited second ink under conditions effective to form the reflective element, wherein the depositing optionally comprises direct write printing the second ink onto the second surface, and the treating optionally comprises one or more of: drying the deposited second ink, heating the deposited second ink, and/or applying UV radiation to the deposited second ink. Optionally, the process further comprises the step of: (d) forming a second coating on the third surface, the second coating having a fourth surface. The second coating optionally is transparent.

In another embodiment, the invention is to a reflective feature, comprising (a) a substrate; (b) a reflective element comprising metallic nanoparticles; and (c) an overcoat comprising a colorant. The overcoat optionally is transparent. The overcoat optionally comprises a material selected from the group consisting of: a varnish, an offset varnish, a dry offset varnish, a shellac, latex, and a polymer.

In another embodiment, the invention is to a process for forming a reflective feature, the process comprising the steps of: (a) providing a substrate; (b) forming a reflective element on the substrate, the reflective element comprising metallic nanoparticles; and (c) forming an overcoat on the reflective element, the overcoat comprising a colorant. In this embodiment, the step of forming the reflective element comprising metallic nanoparticles optionally comprises direct write printing an ink comprising the metallic nanoparticles onto the substrate. The step of forming the overcoat comprising a colorant optionally comprises direct write printing an ink comprising the colorant onto the substrate and/or the reflective element.

BRIEF DESCRIPTION OF THE DRAWINGS

The present invention will be better understood in view of the appended non-limiting figures, wherein.

DETAILED DESCRIPTION OF THE INVENTION

Introduction

Figure 1:
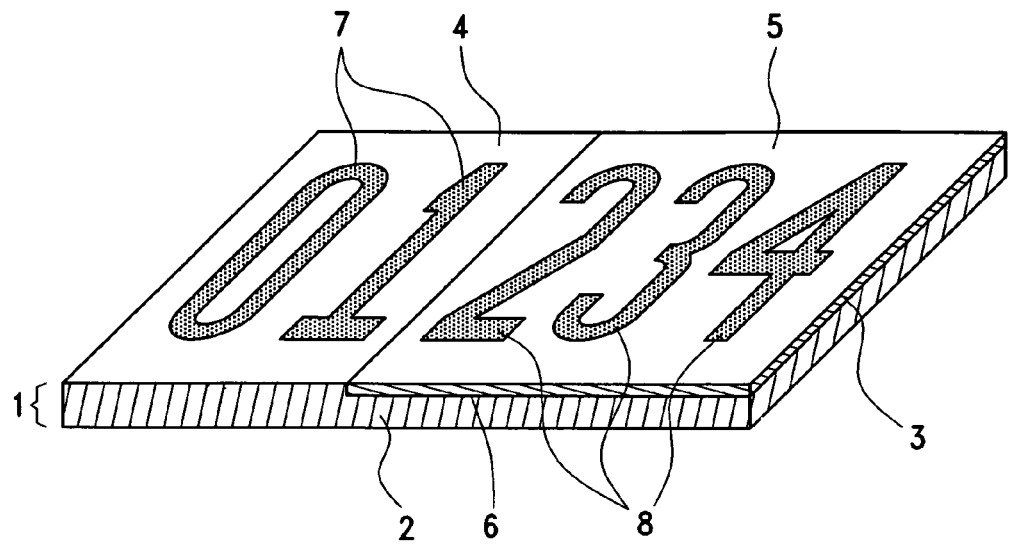
FIG. 1 illustrates a reflective feature disposed on a substrate having a first region and a second region, the first and second regions having different surface characteristics.

The present invention, in one embodiment, relates to a reflective feature, preferably a reflective security feature or a reflective decorative feature, formed by printing multiple inks onto multiple regions of a substrate, the regions having different surface characteristics from one another. The reflective feature includes a first reflective element disposed on a first region and a second reflective element disposed on a second region, wherein the first reflective element is more adherent than the second reflective element to the first region. The second reflective element preferably is similarly more adherent than the first reflective element to the second region. As it is generally difficult to form features on a substrate having multiple regions with different surface characteristics, this embodiment of the invention provides a highly secure difficult-to-reproduce reflective feature having significant commercial value. The invention also relates to processes for forming such reflective features.

In another embodiment, the invention relates to a multi-layered reflective feature, preferably a reflective security feature or a reflective decorative feature, formed from multiple inks. The multi-layered reflective features desirably are highly durable and/or highly reflective. The invention also relates to processes for forming such reflective features.

As used herein, the term "security feature" means a feature that is placed on or otherwise incorporated into an article (e.g., a tag or label, a document such as a passport, check, bond, banknote, currency, ticket, etc.), directly or indirectly, for the purpose of authenticating the article. As used herein, the term "decorative feature" means a feature that is not provided primarily for an authentication purpose, but rather primarily for a graphical or decorative purpose. As used herein the term "reflective element" means a reflective portion of a reflective feature.

Possible uses for the reflective features of the present invention may vary widely. Generally, the reflective features of the invention may be employed as security features in any product that is subject to counterfeiting, imitation or copying. Thus, in one embodiment, the invention is to a banknote comprising the reflective feature of the present invention. In another embodiment, the invention is to a fiduciary document comprising the reflective feature of the invention. In another embodiment, the invention is to a certificate of authenticity comprising the reflective feature of the invention. In another embodiment, the invention is to a brand authentication tag comprising the reflective feature of the present invention. In another embodiment, the invention is to an article of manufacture comprising a brand authentication tag comprising the reflective feature of the present invention. In another embodiment, the invention is to a tax stamp comprising the reflective feature of the present invention. In another embodiment, the invention is to an alcohol bottle comprising a tax stamp comprising the reflective feature of the present invention. In another embodiment, the invention is to a tobacco product container comprising a tax stamp comprising the reflective feature of the present invention. The present invention is not limited to the foregoing examples, and a number of other substrates and/or substrate surfaces may comprise the reflective features of the present invention.

The reflective features of the present invention are not limited to security applications. The features may also be employed, for example, for brand protection, brand personalization (e.g., short run personal care/cosmetics), trademarks, or in graphics, decorative features, non-secure documents (e.g., business cards, greeting cards, paper products, etc.), advertisements, mass mailings, wall paper, ceramic tiles, to name but a few. Thus, in one embodiment, the reflective feature comprises a decorative feature. The present invention is not limited to the foregoing examples, and a number of other substrates and/or substrate surfaces may comprise the features of the present invention.

Reflective Features Formed on Regions of a Substrate Having Different Surface Characteristics In a first embodiment, the invention is to a reflective feature, preferably a reflective security feature or a reflective decorative feature, comprising a substrate having a first region and a second region, the first and second regions having different surface characteristics. A first reflective element is disposed on the first region and a second reflective element is disposed on the second region. In this embodiment, the first reflective element is more adherent than the second reflective element to the first region, and, preferably, the second reflective features is more adherent than the first reflective element to the second region.

As used herein, the term "surface characteristic" is meant to refer to any property that affects the level of adherence of a substance, e.g., a fluid ink or a composition formed therefrom, to a surface. By way of non-limiting examples, wetting characteristics, porosity, surface energy, charge, bonding ability and hydrophobicity are surface characteristics that may affect the level of adherence of a substance to a surface. In one embodiment, for example, the first region (and the first surface thereof) is more porous than the second region (and the second surface thereof). In another embodiment, the first region (and the first surface thereof) is less porous than the second region (and the second surface thereof). In another embodiment, the first region (and the first surface thereof) is more hydrophilic (less hydrophobic) than the second region (and the second surface thereof). In another embodiment, the first region (and the first surface thereof) is less hydrophilic (more hydrophobic) than the second region (and the second surface thereof). In another embodiment, the first region (and the first surface thereof) has a surface energy that is greater than the surface energy of the second region (and the second surface thereof). In another embodiment, the first region (and the first surface thereof) has a surface energy that is less than the surface energy of the second region (and the second surface thereof).

For purposes of the present specification, the level of adherence of the first and second reflective elements to the first and second regions may be determined by ASTM rub test: ASTM D-5264D92, the entirety of which is incorporated herein by reference, wherein the adherence is rated on a scale of 1 to 5, a rating of 5 indicating the highest level of adherence. Under this test, the first reflective element preferably has an adherence to the first region that is rated a 2 or greater, 3 or greater, 4 or greater or 5 on ASTM D-5264D92. Additionally, the second reflective element preferably has level of adherence to the second region that is 2 or greater, 3 or greater, 4 or greater or 5 as determined by ASTM D-5264D92. In another aspect, the durability of the first and second reflective elements may be determined by using a Scotch tape test, in which pressure-sensitive tape is applied to an area of the feature (e.g., the first and second reflective elements thereof), which optionally is cross-hatched with scratched lines, and then lifted off. Adhesion is considered to be adequate if the coating is not pulled off by the tape when it is removed. Substantial removal of the first and/or second reflective elements with the Scotch tape indicates durability failure under this test.

The specific form of the reflective feature, e.g., reflective security features or reflective decorative features, has myriad possibilities. In a preferred embodiment, the reflective feature comprises an image. The image may vary widely, but may include, for example, a geometric image or shape, alphanumeric characters, microimages, microprint (2 pt font size or smaller, height less than about 400 µm, e.g., less than about 300 µm, less than about 200 µm or less than about 100 µm), a personal image (e.g., image of an individual), photograph, fingerprint, design, barcode, logo, trademark, pattern, e.g., guilloche pattern or rosette pattern, or other object. In a preferred embodiment, the reflective features exhibit variable information, as discussed in greater detail below.

In a preferred embodiment, the first reflective element (as well as the first ink used to form the first reflective element) is disposed exclusively on the first region. As the second reflective element is optionally more adherent than the first reflective element to the second region, this embodiment minimizes the potential for beading, smearing, over-saturation and/or overall poor adhesion that would likely occur if the first reflective element (or a portion thereof) were formed on the second region. Forming the first reflective element exclusively on the first region, therefore, contributes to the desired reflectivity and/or appearance of the overall reflective feature.

Similarly, in a preferred embodiment, the second reflective element (as well as the second ink used to form the second reflective element) is disposed exclusively on the second region. As the first reflective element is more adherent than the second reflective element to the second region, this embodiment minimizes the potential for beading, smearing, over-saturation and/or overall poor adhesion that would likely occur if the second reflective element (or a portion thereof) were formed on the first region. Disposing the second reflective element exclusively on the second region, therefore, contributes to the desired reflectivity and/or desired appearance of the overall reflective feature.

The reflective features of the invention, e.g., reflective security features or reflective decorative features, are not limited to being formed on substrates having two regions (e.g., two surfaces) with different surface characteristics. In one embodiment, the substrate further comprises a third region, the reflective feature further comprising a third reflective element disposed on the third region, wherein the third reflective element (as well as the ink used to form the third reflective element) is more adherent than the first reflective element or the second reflective element to the third region. The presence of a third reflective element disposed on a third region improves the ability to reliably authenticate an item such as, e.g., a banknote if such an item comprises a substrate comprising a first region, a second region, and a third region. As discussed below, the ability to form reflective elements on different substrate surfaces, while maintaining a uniform overall appearance of the reflective feature among the reflective elements, is a particularly useful aspect of the present invention, as it is difficult to reproduce such reflective features. Of course, substrates having more than three regions may also be employed.

In one embodiment, the first reflective element and/or the second reflective element are specularly reflective or mirror-like. Specularly reflective elements in general are desirable because they are readily identifiable, yet generally difficult to form and, therefore, to reproduce, for example, even with a sophisticated color photocopier. Preferably, the reflective feature of the present invention comprises a first reflective element comprising metallic nanoparticles. Additionally or alternatively, the second reflective element comprises metallic nanoparticles. The use of metallic nanoparticles to form the first and/or second reflective features is also desirable in that inks comprising metallic nanoparticles may be deposited using direct write printing processes, e.g., ink jet printing, to form the reflective elements, and in particular, to form reflective features comprising variable information, as discussed below. Further, metallic nanoparticles have been found to impart highly reflective properties to the reflective features. Thus, this embodiment provides two aspects that are difficult to reproduce and, therefore, can function to verify the authenticity of an item. The first aspect that is difficult to reproduce is forming a reflective feature disposed on different regions of a substrate having different surface characteristics. The second aspect that is difficult to reproduce is the highly reflective nature of reflective elements comprising metallic nanoparticles.

The reflective features, e.g., reflective security features or reflective decorative features, preferably comprise metallic nanoparticles. If present, the nanoparticles optionally are in the form of a continuous reflective film, which may be formed through removal of the liquid phase, e.g., ink vehicle, and/or through post-deposition treating, e.g., curing. If the reflective features comprise metallic nanoparticles, a majority (e.g., at least 50%, at least 70%, at least 85% or at least 95%) of the metallic nanoparticles optionally are necked with at least one adjacent metallic nanoparticle in the continuous film. By necking it is meant that adjacent particles are physically connected to one another through a necking region, while retaining at least some recognizable degree of their original, e.g., spherical, form. The degree of necking will vary widely depending, for example, on the composition (and melting point) of the nanoparticles and on the treating, e.g., curing, conditions employed in forming the reflective features. In another embodiment, a majority (e.g., at least 50%, at least 70%, at least 85% or at least 95%) of the metallic nanoparticles are independent from (meaning not necked with) any adjacent nanoparticles in the continuous film.

In one embodiment, the reflective feature, is disposed, e.g., positioned, formed or printed, over an underlying element (e.g., an underlying image, optionally an underlying reflective image), the underlying element preferably being at least partially visible through the feature when viewed at one angle (for example, if the reflective feature is translucent or has gaps in it through which one can view the underlying element). The underlying element may become obscured, however, when viewed from another angle, relative to the surface of the reflective feature. The effect of obscuring an underlying element is further described in co-pending U.S. patent application Ser. No. 11/331,233, filed Jan. 13, 2006, entitled "Reflective features, Their Use and Processes for Making Them," the entirety of which is incorporated herein by reference. Optionally, the underlying element comprises metallic particles, e.g., metallic nanoparticles.

In another embodiment, an overlying element (e.g., an overlying image, optionally an overlying reflective image) is disposed over, e.g., on top of, the first and/or second reflective elements. Optionally, the overlying element is clearly visible when viewed from one angle (a first angle) and the overlying reflective element is at least partially obscured when viewed from another angle (a second angle). Optionally, the overlying element comprises metallic particles, e.g., metallic nanoparticles.

Figure 2:
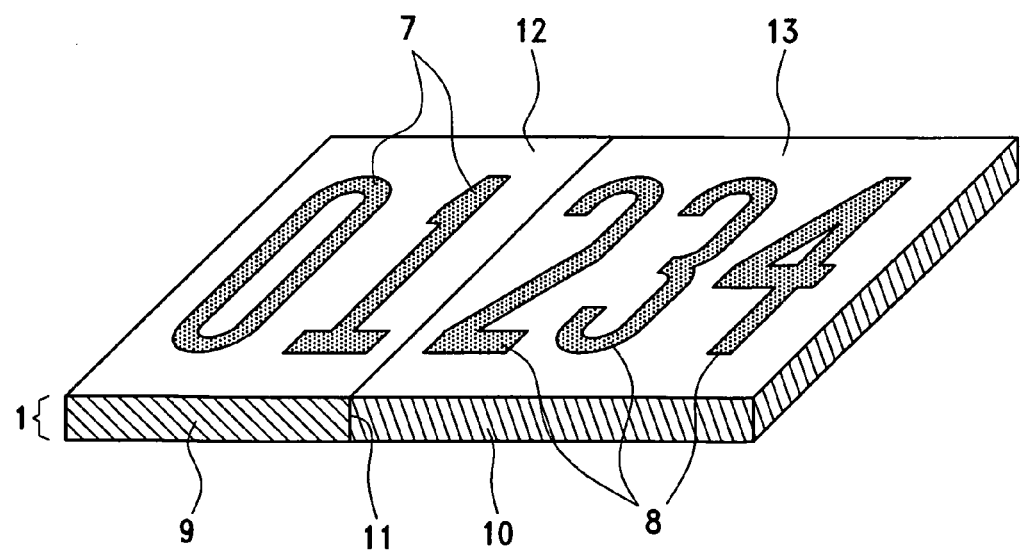
FIG. 2 illustrates another substrate having a first region and a second region, the first and second regions having different surface characteristics.
Figure 3:
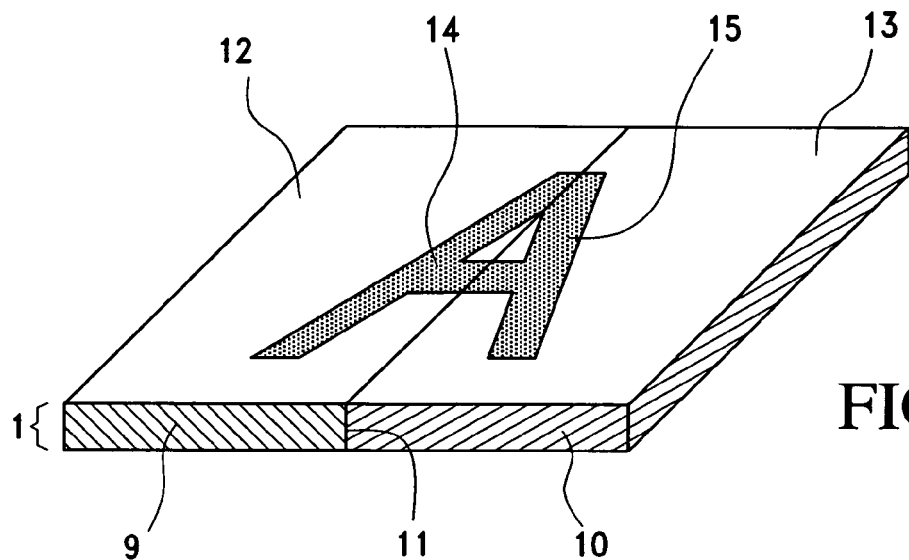
FIG. 3 illustrates a reflective feature disposed on a substrate having a first region and a second region, the first and second regions having different surface characteristics, and the feature extending across the interface between the two regions.

In one embodiment of the present invention, the first reflective element and the second reflective element form a continuous graphical feature that spans at least a part of the first region and at least a part of the second region. As used herein, the term "graphical feature" is meant to refer to the overall shape or outline of the reflective feature. As use herein, the term "continuous" is meant to refer to a single, discreet, connected object or part of an object, optionally formed from one or more inks, substantially free of gaps. Non-limiting examples of graphical features of the present invention include any geometric image or shape, one or more alphanumeric characters, microimages, microprint (2 pt font size or smaller, height less than about 400 µm, e.g., less than about 300 µm, less than about 200 µm or less than about 100 µm), personal image (e.g., image of an individual), photograph, fingerprint, design, barcode, logo, trademark, pattern, e.g., guilloche pattern or rosette pattern, or other object. Additionally, the first reflective element and the second reflective element optionally form a continuous graphical feature that extends across the interface between the first region and the second region of a substrate to form a continuous graphical feature that is difficult to reproduce, and may serve to authenticate an item. FIG. 3, discussed below, provides an example of a continuous graphical feature in which the letter "A" extends continuously across the interface 11 between first region 12 and second region 13. This embodiment is particularly desirable for security applications if the first and second regions exhibit substantially different surface characteristics, as it is difficult to form a continuous graphical feature, having a single uniform appearance, extending across regions having substantially different surface characteristics. FIGS. 1 and 2, discussed below, provide examples of non-continuous graphical reflective feature having a first reflective element 7 comprising the numbers "01" and a second reflective element 8 comprising the numbers "234," the second reflective element 8 being separate from the first reflective element 7, but forming a single graphical reflective feature.

The substrate, as well as the compositions forming the first and second regions thereof, may vary widely. In one embodiment, the substrate is selected from the group consisting of a banknote, a brand authentication tag, a tax stamp, an ID document, an alcoholic bottle, and a tobacco product. Optionally, the first region and/or the second region of the substrate may comprise foil, film, UV-coated lacquer, paper, polymer, coated paper, or printed paper. In terms of composition, the substrate optionally comprises one or more of the following: a fluorinated polymer, polyimide, epoxy resin (including glass-filled epoxy resin), polycarbonate, polyester, polyethylene, polypropylene, bi-oriented polypropylene, mono-oriented polypropylene, polyvinyl chloride, ABS copolymer, wood, paper, metallic foil, glass, banknotes, linen, labels (e.g., self adhesive labels, etc.), synthetic paper, flexible fiberboard, non-woven polymeric fabric, cloth and other textiles. Other particularly advantageous substrates and substrate surfaces include cellulose-based materials such as wood, paper, cardboard, or rayon, and metallic foil and glass (e.g., thin glass). In another embodiment, the substrate comprises a perforated or non-perforated Teslin™ film or coating, a strong hydrophobic synthetic film or coating manufactured by PPG Industries, Inc.

The compositions employed to form the substrate regions may vary widely. In one embodiment, the composition of the substrate forms a substrate region. In another embodiment, a separate coating or material forms a substrate region. Non-limiting examples of compositions that may employed to form the regions and surfaces of the present invention, in addition to those provided above, include foil, film, UV-coated lacquer, paper, coated paper, polymer, and printed paper. In one embodiment, the reflective feature of the present invention comprises a substrate comprising a first region comprising a composition selected from the group consisting of foil, film, UV-coated lacquer, paper, coated paper, polymer, and printed paper. The second region similarly may comprise a composition selected from the group consisting of foil, film, UV-coated lacquer, paper, coated paper, polymer, and printed paper (so long as it is a different composition than the first region).

In one embodiment, the reflective feature of the present invention comprises a substrate having a first region comprising a first undercoat. The first undercoat optionally comprises a composition selected from the group consisting of varnishes, offset varnishes, dry offset varnishes, shellacs, latexes, and polymers. As used herein, the term "undercoat" refers to a coating disposed underneath a reflective element and on top of a supporting substrate. If the first region comprises a first undercoat, the first reflective element, which is disposed on the first undercoat of the first region, exhibits enhanced reflectivity relative to the reflectivity of the first reflective element in the absence of the first undercoat. The presence of the undercoat may also facilitate adhesion and durability of the first reflective element.

In a similar embodiment, optionally in addition to employing a first undercoat, the second region optionally comprises a second undercoat. As explained above, the first and second regions of this embodiment of the present invention have different surface characteristics, and in this embodiment the formulation of the first undercoat creates the characteristics of the first region, and the formulation of the second undercoat creates the characteristics of the second region. Preferably, with the second region comprising the second undercoat, the second reflective element exhibits enhanced reflectivity relative to the reflectivity of the second reflective element in the absence of the second undercoat.

In one embodiment, the reflective feature of the present invention further comprises an overcoat, e.g., a first overcoat, disposed on the first reflective element. The overcoat optionally comprises a composition selected from the group consisting of varnishes, offset varnishes, dry offset varnishes, shellacs, latexes, and polymers. Preferably, with the first overcoat disposed on the first reflective element, the first reflective element exhibits enhanced reflectivity relative to the reflectivity of the first reflective element in the absence of the first overcoat. In addition, with the first overcoat disposed on the first reflective element, the first reflective element preferably exhibits enhanced durability relative to the durability of the first reflective element in the absence of the first overcoat. In this embodiment, for example, the overcoated first reflective element preferably adheres sufficiently to the first region to rate a score of 2 or greater, 3 or greater, 4 or greater, or 5 on the ASTM rub test D-5264D92. The overcoated first reflective element on the first region also preferably passes the Scotch tape test, discussed above.

Optionally, the first overcoat also is disposed on the second reflective element. Preferably, with the first overcoat disposed on the second reflective element, the second reflective element exhibits enhanced reflectivity relative to the reflectivity of the second reflective element in the absence of the first overcoat. In addition, with the first overcoat disposed on the second reflective element, the second reflective element preferably exhibits enhanced durability relative to the durability of the second reflective element in the absence of the first overcoat. In this embodiment, for example, the overcoated second reflective element preferably adheres sufficiently to the second region to provide a score of 2 or greater, 3 or greater, 4 or greater, or 5 on the ASTM rub test D-5264D92. The overcoated second reflective element on the second region also preferably passes the Scotch tape test, discussed above.

Optionally, the reflective feature further comprises a second overcoat disposed on the second reflective element. Preferably, with the second overcoat disposed on the second reflective element, the second reflective element exhibits enhanced reflectivity relative to the reflectivity of the second reflective element in the absence of the second overcoat. In addition, with the second overcoat disposed on the second reflective element, the second reflective element preferably exhibits enhanced durability relative to the durability of the second reflective element in the absence of the second overcoat. Optionally, the reflective feature comprises a second overcoat disposed on the second reflective element, but the reflective feature does not include a first overcoat (i.e., a separate overcoat covering any portion of the first reflective element).

FIG. 1 illustrates a substrate 1 comprising a first region 2 and a second region 3. The first region 2 has a first surface 4 and an interface surface 6, which acts to support the second region 3. The second region 3 that is supported on interface surface 6 has a second surface 5. The compositions of the first region 2 and the second region 3 may vary widely. As a non-limiting example, the first region 2 could comprise linen (e.g., in a bank note) and the second region 3 could comprise a metallic foil disposed on top of and adhered to the linen. Importantly, the first surface 4 and the second surface 5 have different surface characteristics, meaning they have different properties that affect the level of adherence of a substance (e.g., an ink) to their respective surfaces.

In the linen/foil example provided above, the different surface characteristics may comprise different porosities. The linen may, for example, be substantially more porous than the foil. Also, the different surface characteristics may comprise different degrees of hydrophillicity; for example, the linen may be more hydrophilic than the foil (which may be hydrophobic). These different surface characteristics may render the two surfaces intolerant to receiving a single type of ink because a single ink may not possess properties that are compatible with both surfaces. That is, depending on the degree of the difference between the two surface characteristics, a single ink may not possess attributes that render it suitable for printing on both first surface 4 and second surface 5. A single ink may, however, be suitable for one surface, but not the other.

FIG. 1 also illustrates a single non-continuous reflective feature comprising the numbers "01234" disposed on substrate 1. The reflective feature comprises a first reflective element 7 and a second reflective element 8. Specifically, the first reflective element 7 comprises the numbers "01", and the second reflective element 8 comprises the numbers "234". Semantically, the number "1" (disregarding the number "0") also could be considered a first reflective element since it is disposed on the first region 2, and the number "2" (disregarding the numbers "34") could be considered a second reflective element since it is disposed on the second region 3. According to this embodiment of the present invention, the first reflective element 7 (however characterized) is more adherent to the first region 2, e.g., the first surface 4 of the first region 2, than the second reflective element 8 would be if it were formed on first surface 4 of first region 2. Similarly, the second reflective element 8 ideally is more adherent to the second region 3, e.g., the second surface 5 of the second region 3, than the first reflective element 7 would be if it were formed on second surface 5 of second region 3.

Although it is contemplated that the optical properties (e.g., color, hue and reflectivity) of the first reflective element 7 may differ from the optical properties of the second reflective element 8, preferably the optical properties of the first reflective element 7 are substantially the same as the optical properties of the second reflective element 8 such that together the two reflective elements form a single reflective feature (e.g., the number "01234" in FIG. 1) that has a uniform overall appearance to an observer. That is, preferably the two reflective elements appear to have similar or substantially the same optical properties such that the two reflective elements appear to a lay observer to have been formed from a single ink. Desirably, the formation of a single reflective feature having an overall uniform appearance on a substrate having multiple regions with different surface characteristics is very difficult to reproduce for would-be counterfeiters.

The reflective feature shown in FIG. 1 may be formed, for example, by depositing, e.g., printing, a first ink on first surface 4 and optionally treating, e.g., curing, the deposited first ink under conditions effective to form the first reflective element 7, and by depositing, e.g., printing, a second ink on second surface 5 and optionally treating, e.g., curing, the deposited second ink under conditions effective to form the second reflective element 8. Optionally, the first and second inks are deposited and then treated, e.g., cured, in a single step. The first ink preferably is more adherent to the first region 2, e.g., the first surface 4 of the first region 2, than the second ink would be if it were deposited on first surface 4 of first region 2. Similarly, The second ink preferably is more adherent to the second region 3, e.g., the second surface 5 of the second region 3, than the first ink would be if it were deposited on second surface 5 of second region 3. In various embodiments, the first ink may deposited before, after, simultaneously with or substantially simultaneously with deposition of the second ink.

FIG. 2 illustrates another embodiment of the present invention similar to the one described above with reference to FIG. 1, but in which the substrate 1 comprises a first region 9 (having first surface 12) situated adjacent second region 10 (having second surface 13), rather than having one of the regions disposed on top of another region, e.g., a foil disposed on top of an underlying linen supporting substrate. As in FIG. 1, the first surface 12 and the second surface 13 preferably have different surface characteristics. The two regions are connected, e.g., adhered, to one another at interface 11.

FIG. 3 illustrates another embodiment of the present invention in which the reflective feature comprises a first reflective element 14, which forms the left portion of the letter "A", and a second reflective element 15, which forms the right portion of the letter "A". This reflective feature comprises a continuous graphical feature spanning both the first region and the second region of a substrate. That is, together, the first and second reflective elements 14, 15 form a single continuous reflective feature that extends across interface 11 unlike the reflective feature "01234" shown in FIGS. 1 and 2, which comprises elements ("01" and "234") that are non-continuous (e.g., separate) with respect to one another.

Figure 4:
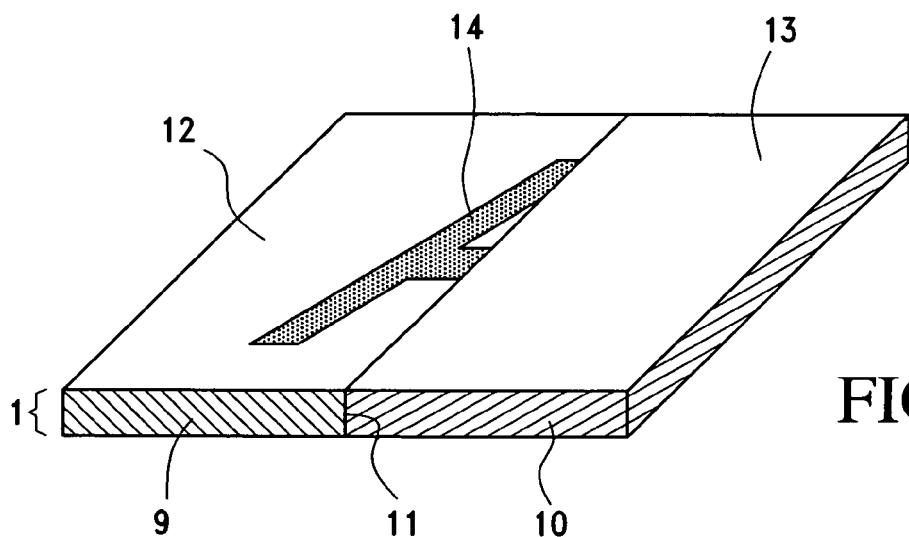
FIG. 4 illustrates an intermediate reflective feature disposed on the first region of a substrate having a first region and a second region, the first and second regions having different surface characteristics.

FIG. 4 shows an intermediate feature that may be formed during the fabrication of the reflective feature shown in FIG. 3. As with the embodiment shown in FIGS. 1 and 2, the first reflective element 14 and the second reflective element 15 shown in FIG. 3 preferably are formed from a first ink and a second ink, respectively, the inks being suited for deposition, e.g., printing, onto the first substrate surface 12 and the second substrate surface 13, respectively. As discussed above, the first ink may be deposited before, after, simultaneously with or substantially simultaneously with deposition of the second ink. The intermediate feature shown in FIG. 4 would be formed after deposition of the first ink to form the first reflective element 14, but prior to deposition of a second ink to form the second reflective element 15 (the right portion of the letter "A") shown in FIG. 3.

Processes for Forming a Reflective Features on Regions of a Substrate Having Different Surface Characteristics In another embodiment, the invention is to a process for forming a reflective feature, e.g., any of the features shown in FIGS. 1-4, the process comprising the steps of: providing a substrate comprising a first region and a second region, the two regions preferably having different surface characteristics from one another; direct write printing, e.g., ink jet printing (piezo-electric, thermal ink jet, drop-on-demand or continuous ink jet (CIJ) printing), a first ink onto the first region to form a first reflective element; and direct write printing, e.g., ink jet printing (piezo-electric, thermal, drop-on-demand or continuous ink jet printing), a second ink onto the second region to form a second reflective element, wherein the first ink is more adherent than the second ink to the first region. Ideally, the second ink is more adherent than the first ink to the second region.

Optionally, the substrate further comprises a third region having a different surface characteristics than either the first region or the second element, and the process further comprises the step of direct write printing, e.g., ink jet printing (piezo-electric, thermal, drop-on-demand ink jet, or continuous ink jet (CIJ) printing), a third ink onto the third region to form a third reflective element, and wherein the third ink is more adherent than the first ink or the second ink to the third region. Of course, more than three inks may be used to form, for example, more than three reflective elements, as discussed above.

The process optionally includes steps of treating, e.g., curing, the deposited inks (e.g., one or more of the first, second and/or optional third ink) so as to facilitate removal of the liquid components of the inks (e.g., vehicles) and convert the deposited inks to a highly robust, durable reflective features. The treating optionally comprises simply allowing the deposited ink or inks to dry. In this embodiment, the vehicle in the deposited inks is allowed to vaporize (with or without application of one or more of heat, pressure, IR radiation and/or UV radiation) into the atmosphere to form the feature, e.g., security or decorative feature. After drying, the nanoparticles yielded from the inks during drying have a relatively high degree of reflectivity, meaning the nanoparticle film or layer formed from the ink or inks possesses a high degree of optical smoothness (e.g., having a surface roughness less than 100 nm). With optional subsequent additional treating steps, e.g., heating, rolling, pressing, UV curing, IR curing, etc., the reflectivity increases, meaning that the optical smoothness of the nanoparticle film or layer (e.g., the first reflective element and/or the second reflective element) is increased relative to the reflectivity in the case of just allowing the deposited ink to dry without an additional treating step. If the inks include metallic nanoparticles, the treating may also allow adjacent nanoparticles to sinter or neck with one another so as to provide increased reflectivity and durability. Surface roughness of the feature (e.g., the first and second reflective elements thereof) after curing by one or more of heating, rolling, pressing, UV curing, or IR curing, may be on the order of 50 nm or less. Thus, depending on how the deposited inks are treated, the feature optionally comprises first and/or second reflective elements comprising the nanoparticles, the first and/or second elements having a route mean square surface roughness that is less than about 100 nm, less than about 75 nm or less than about 50 nm. In one embodiment, the deposited first and second inks may be cured in a single treating step (after deposition of the inks) or in multiple treating steps, e.g., a first ink may be deposited and then cured, followed by deposition of a second ink and curing of the second ink.

The utilization of direct write printing to form the reflective features of the present invention is highly desirable in that it provides the ability to create features that comprise variable information, meaning information that is individualized for a product unit, such as, but not limited to, serialized data. For example, a serial number is one non-limiting type of variable information. Other types of variable information include: counters, lettering, sequential symbols, alphanumeric variable information, non-serialized variable information (variable information that is not sequential), and combinations thereof. Thus, in one embodiment, the reflective feature, e.g., reflective security feature or reflective decorative feature, comprises, exhibits or displays variable information.

In addition to being able to individualize a document, tag, etc., the ability to incorporate variable information in a feature, e.g., reflective feature, provides even further anti-counterfeiting measures not recognized or available until now. For even further increased security, the feature optionally comprises variable information such as a serial number comprising a plurality of numbers, where at least one of the numbers is disposed or printed on the first surface of the first region with a first ink, and at least one of the numbers is disposed or printed on the second surface of the second region with a second ink. In effect, a serial number comprises multiple numbers, each of which may be characterized as a separate element of the reflective feature, at least two numbers of which are formed from different inks specifically suited for different surfaces.

As indicated above, the reflective features preferably are formed from multiple inks, each ink preferably being formulated to optimally adhere to a given substrate surface (e.g., first or second surface of first or second regions, respectively) and form a different reflective element. Unlike the adherence test discussed above for determining the level of adherence of a solid reflective element onto a substrate region, the ability of a fluid ink to adhere to a substrate surface may be characterized by the contact angle formed between a respective ink droplet and the surface on which the ink is deposited, e.g., printed. As used herein, the term "contact angle" means the angle at which a liquid/vapor interface meets the substrate surface (e.g., first surface or second surface). The contact angle, θ, of an ink with a surface is determined primarily by the interfacial energies of the materials involved, as related by the equation:

$$\gamma_{sv} = \gamma_{sl} + \gamma_{lv} \cos\theta$$

where $\gamma_{sv}$ is solid-vapor interfacial energy, $\gamma_{sl}$ is solid-liquid interfacial energy, and $\gamma_{lv}$ is liquid-vapor interfacial energy. For purposes of the present specification and appended claims, the contact angle is determined by using a Kruss Goniometer and measuring the static contact angle for relatively smooth surfaces and dynamic contact angles for slightly rough surfaces.

Generally, if the contact angle is less than about 90°, the ink is considered "wetting" and desirably can spread on the surface. For the liquid to completely wet the surface, the contact angle should approach zero. For spreading to occur, the surface energy of the solid must be greater than the combination of the surface tension of the liquid and the interfacial tension between the solid and the liquid. Although there are exceptions, generally speaking, the more adherent (wetting) an ink is to a particular substrate region, the more adherent the resulting reflective element will be to that substrate region.

Figure 5:
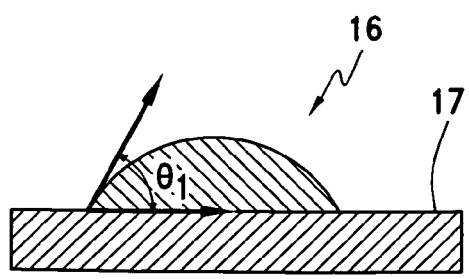
FIG. 5 illustrates a wetting ink droplet on a substrate surface.
Figure 6:
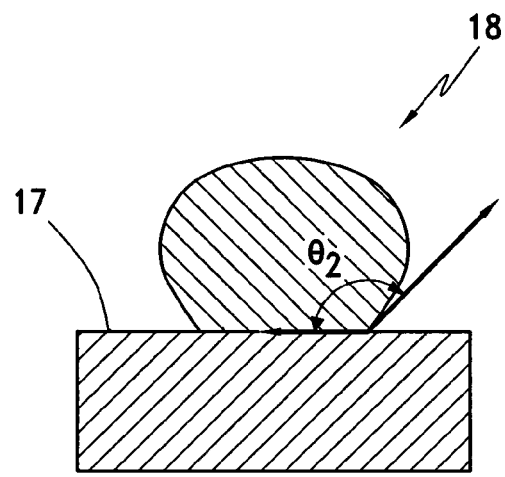
FIG. 6 illustrates a non-wetting ink droplet on a substrate surface.

FIG. 5 illustrates the contact angle, $\theta_1$, for an ink droplet 16 that exhibits good wetting characteristics on substrate surface 17. Desirable wetting characteristics are reflected by an ink having a contact angle with a certain substrate surface that is less than 90°, preferably less than about 75°, more preferably less than about 45°, or less than about 30°. A contact angle of greater than 90° is generally indicative of a non-wetting ink. FIG. 6 illustrates a non-wetting ink droplet 18 on substrate surface 17 with a contact angle, $\theta_2$, that is greater than 90°.

In a preferred embodiment, after deposition (e.g., printing), the first ink on first region, e.g., first surface of the first region, preferably has a contact angle less than 90° (is wetting), e.g., less than about 75°, less than about 45°, less than about 30°, and most preferably from about 1° to about 20°. Optionally, the second ink on second region, e.g., second surface of the second region, preferably has a contact angle less than 90° (is wetting), e.g., less than about 75°, less than about 45°, less than about 30°, and most preferably from about 1° to about 20°. Hereinafter, the contact angle of the first ink with the first region (e.g., first surface thereof) is referred to as the first contact angle, and the contact angle of the second ink with the second region (e.g., second surface thereof) is referred to as the second contact angle.

As indicated above, the first ink preferably is more adherent than the second ink to the first region, e.g., the first surface of the first region. By "more adherent" it is meant that the first contact angle is less than (optionally by at least about 5°, at least about 10°, at least about 20°, at least about 30°, at least about 45°, at least about 60° or at least about 80°) the contact angle that would be created if the second ink were deposited on the first region, e.g., on the first surface of the first region. Conversely, it has been indicated that the second ink preferably is more adherent than the first ink to the second region, e.g., the second surface of the second region. By this it is meant that the second contact angle is less than (optionally by at least about 5°, at least about 10°, at least about 20°, at least about 30°, at least about 45°, at least about 60° or at least about 80°) the contact angle that would be created if the first ink were deposited on the second region, e.g., on the second surface of the second region.

Many properties of inks and substrates will impact the contact angle that is created therebetween. By way of non-limiting examples, wetting characteristics, porosity, surface energy, charge, bonding and hydrophilicity/hydrophobicity are surface characteristics that may affect the level of adherence of a substance to a surface. Properties of inks used to form the reflective features of the invention that may impact the level of adherence to a given substrate surface include surface tension, hydrophilicity/hydrophobicity, charge, viscosity, and vapor pressure.

Inks may be modified to provide the desired physical characteristics that render them suitable for deposition on a specific region by a variety of different methods. As one example, the surface tension and hydrophilicity/hydrophobicity of an ink may be modified by adding or reducing the amount of surfactant contained in the ink. In another embodiment, the relative amounts and types of vehicles employed in the ink may be modified to arrive at an ink having the desired surface tension, hydrophilicity/hydrophobicity, viscosity and vapor pressure. In another embodiment, one or both the first region and the second region are treated, e.g., by laser-treating, chemical treating, e.g., with ozone, to improve the adherence of the first and second inks, respectively, thereto.

The inks used to form reflective elements may comprise a variety of different compositions. In various embodiments, an ink used to form a reflective element may comprise one or more of the following: particulates (preferably metallic nanoparticulates), one or more metal precursors, one or more vehicles, colorants (e.g., dyes or pigments), an anti-agglomeration agent, a reducing agent, one or more additives (such as, but not limited to surfactants, polymers, biocides, thickeners, binders, etc.) or other components.

In a preferred embodiment, either or both the first ink and/or the second ink as well as the reflective features formed therefrom comprise metallic nanoparticles. Thus, in a preferred embodiment, either or both the first reflective element and/or the second reflective element, which are formed from the first and second inks, respectively, also comprise metallic nanoparticles. Preferably, the metallic nanoparticles in either or both the first reflective element and/or the second reflective element form a highly reflective film or films. By "highly reflective," it is meant that the nanoparticles when formed in a film exhibit at least some degree of non-diffuse or non-Lambertian reflectivity. That is, the nanoparticle film or films (as well as the overall features of the invention) preferably exhibit some degree of specular reflectivity, optionally some degree of colored specular reflectivity. It is contemplated, however, that the nanoparticle film(s), the first and/or second reflective elements and/or the reflective features themselves may exhibit some degree of diffuse reflectivity, in addition to specular reflectivity. Reflective elements comprising metallic nanoparticles have been found to exhibit enhanced reflectivity, particularly enhanced specular reflectivity, over conventional features.

As used herein, the term "metallic nanoparticles" means particles comprising a metal or metallic characteristic and having an average particle size of less than about 1 μm. One skilled in the art would appreciate that there are many techniques for determining the average particle size of a population of particles, scanning electron microscopy (SEM) being a particularly preferred technique. The average particle size of particles smaller than about 1 μm is also determinable using quasi-elastic light scattering (QELS) techniques (e.g., using a Malvern™ ZetaSizer™). By "comprising a metal" it is meant all or a portion of the particles optionally included in the reflective features of the present invention include, in whole or in part, a metal (e.g., an elemental metal (zero oxidation state) or a mixture or alloy of metals) or a metal-containing compound (e.g., a metal oxide or metal nitride). Thus, in a preferred embodiment, the optional metallic nanoparticles comprise a component selected from the group consisting of a metal, a metal alloy, and a metal-containing compound (e.g., a metal oxide). Additionally or alternatively, the metallic nanoparticles may comprise a component having a metallic characteristic. The term "metallic characteristic" means a reflective or lustrous optical property similar to a metal. For example, a component may exhibit a metallic characteristic by virtue of it having a small electronic band gap.

As indicated above, the optional metallic nanoparticles preferably have an average particle size of less than about 1 μm. In another embodiment, the metallic nanoparticles have an average particle size of less than about 500 nm, more preferably less than about 250 nm, even more preferably less than about 100 nm, and most preferably less than about 80 nm. The metallic nanoparticles optionally have an average particle size greater than about 5 nm, greater than about 10 nm, greater than about 20 nm, greater than about 25 nm, greater than about 30 nm, greater than about 40 nm, greater than about 50 nm, greater than about 100 nm, greater than about 250 nm or greater than about 500 nm. In terms of ranges, the metallic nanoparticles optionally have an average particle size in the range of from about 20 nm to about 1 μm, from about 25 nm to about 1 μm, from about 30 nm to about 1 μm, from about 40 nm to about 1 μm, from about 50 nm to about 500 nm, from about 20 nm to about 100 nm, from about 50 nm to about 100 nm, or from about 50 nm to about 80 nm. The metallic nanoparticles may have a unimodal or multimodal (e.g., bimodal, trimodal, etc.) particle size distribution.

Non-limiting examples of metals for use in the optional metallic nanoparticles and features of the present invention include transition metals as well as main group metals such as, for example, silver, gold, copper, nickel, cobalt, palladium, platinum, indium, tin, zinc, titanium, chromium, tantalum, tungsten, iron, rhodium, iridium, ruthenium, osmium, lead and mixtures thereof. The metallic nanoparticles optionally comprise an alloy comprising at least two metals being selected from the group consisting of: silver, gold, copper, nickel, cobalt, palladium, platinum, indium, tin, zinc, titanium, chromium, tantalum, tungsten, iron, rhodium, iridium, ruthenium, osmium, and lead. Non-limiting examples of preferred metals for use in the present invention include silver, gold, zinc, tin, copper, nickel, cobalt, rhodium, palladium and platinum—silver, copper and nickel being particularly preferred. The metallic nanoparticles optionally comprise a metal selected from the group consisting of silver, gold, zinc, tin, copper, platinum and palladium (including combinations thereof). Non-limiting examples of metal-containing compounds or components that exhibit metallic characteristics and that may be useful as metallic nanoparticles of the features and inks of the present invention include metal oxides, metal nitrides, metal carbides (e.g., titanium nitride or tantalum nitride), metal sulphides and some semiconductors. The metal-containing compound(s) preferably have a small electronic band gap that gives rise to metallic properties or characteristics. A non-limiting list of exemplary metal oxides includes bronzes such as tungsten bronzes including hydrogen tungsten oxide, sodium tungsten oxide and lithium tungsten oxide as well as other bronzes such as phosphor bronzes. Additional tungsten oxides are described in Published U.S. Patent Application No. 2005/0271566A1, which published Dec. 8, 2005, the entirety of which is incorporated herein by reference. In one aspect, the metallic nanoparticles comprise a mineral having a metallic characteristic. A non-limiting list of exemplary minerals suitable for the metallic nanoparticles includes marcasites and pyrites. In another embodiment, the metallic particles and/or the metallic nanoparticles comprise an enamel or a glass/metal composite that provides a metallic characteristic. In one embodiment, the metallic nanoparticles comprise a pearlescent material and/or an opalescent material that provides a metallic characteristic.

The features of the present invention (as well as the inks used to make, form, print, or create the features of the present invention) also, in one embodiment, comprise mixtures of two or more different metallic nanoparticles. In another embodiment, the features of the present invention comprise metallic nanoparticles that comprise two or more metals in the form of an alloy or a mixture of metals or metal containing compounds. Non-limiting examples of alloys useful as metallic nanoparticles of the invention include Cu/Zn, Cu/Sn, Ag/Ni, Ag/Cu, Pt/Cu, Ru/Pt, Ir/Pt and Ag/Co. Optionally, the metallic particles and/or nanoparticles comprise an alloy such as bronze, tungsten bronzes or brass. Also, in an embodiment, the metallic nanoparticles have a core-shell structure made of two different metals such as, for example, a core comprising nickel and a shell comprising silver (e.g. a nickel core having a diameter of about 20 nm surrounded by an about 15 nm thick silver shell). In another embodiment, the core-shell structure may be comprised of a metal oxide core with another metal oxide coating. A non-limiting example is a nanoparticle core-shell structure comprising a mica core and a titania coating. In another embodiment, the metallic nanoparticles comprise metal-effect particles and/or pigments. One method for creating metal effect pigments is to deposit thin layers of one metal oxide or ceramic on the surface of another (e.g. $TiO_2$ on mica). Metal-effect pigments are further described in *CENEAR* Vol. 81, No. 44, pp. 25-27 (Nov. 3, 2003) (ISSN 0009-2347), the entirety of which is incorporated herein by reference.

Metallic nanoparticles suitable for use in the inks to form the inventive reflective features can be produced by a number of methods. For example, the metallic nanoparticles may be formed by spray pyrolysis, as described, for example, in U.S. Provisional Patent Application No. 60/645,985, filed Jan. 21, 2005, or in an organic matrix, as described in U.S. patent application Ser. No. 11/117,701, filed Apr. 29, 2005, the entireties of which are fully incorporated herein by reference. A non-limiting example of one preferred method of making metallic particles and metallic nanoparticles, is known as the polyol process, and is disclosed in U.S. Pat. No. 4,539,041, which is fully incorporated herein by reference. A modification of the polyol process is described in, e.g., P.-Y. Silvert et al., "Preparation of colloidal silver dispersions by the polyol process" Part 1—Synthesis and characterization, J. Mater. Chem., 1996, 6(4), 573-577; Part 2—Mechanism of particle formation, J. Mater. Chem., 1997, 7(2), 293-299, both disclosures of these documents are fully incorporated by reference herein. Briefly, in the polyol process a metal compound is dissolved in, and reduced or partially reduced by a polyol such as, e.g., a glycol, at elevated temperature to afford corresponding metal particles. In the modified polyol process, the reduction is carried out in the presence of a dissolved anti-agglomeration substance, preferably a polymer, most preferably polyvinylpyrrolidone (PVP).

A particularly preferred modification of the polyol process for producing metallic particles, especially metallic nanoparticles, is described in co-pending U.S. patent application Ser. Nos. 60/643,577 filed Jan. 14, 2005, 60/643,629 filed Jan. 14, 2005, and 60/643,578 filed Jan. 14, 2005, and co-pending U.S. patent application Ser. Nos. 11/331,211 filed Jan. 13, 2006, 11/331,238 filed Jan. 13, 2006, and 11/331,230 filed Jan. 13, 2006, which are all herein fully incorporated by reference. In a preferred aspect of a modified polyol process, a dissolved metal compound (e.g., a silver compound such as silver nitrate) is combined with and reduced by a polyol (e.g., ethylene glycol, propylene glycol and the like) at an elevated temperature (e.g., at about 120° C.) and in the presence of a polymer, preferably a heteroatom-containing polymer such as PVP.

Each of the first and second inks preferably comprises a vehicle for imparting desired flow characteristics to the ink. Typically, the vehicles will be carefully selected to provide first and second ink formulations that possess desirable properties for interacting with the first and second regions, respectively, on which they are deposited. Since the surface characteristics of the first and second regions differ from one another, the vehicles selected for the first and second inks typically will differ from one another, whether by type or relative amounts, so as to impart the desired properties for interacting with the first and second regions, respectively.

The vehicles for use in the ink, e.g., direct write, thermal, piezo-electric or continuous ink jet ink or digital ink, is preferably a liquid that is capable of stably dispersing the metallic nanoparticles, if present. For example, vehicles are preferred that are capable of affording an ink dispersion that can be kept at room temperature for several days or even one, two, three weeks or months or even longer without substantial agglomeration and/or settling of the metallic nanoparticles. To this end, it is also preferred for the vehicle to be compatible with the surface of the metallic nanoparticles. It is particularly preferred for the vehicle to be capable of dissolving the anti-agglomeration substance, if present, to at least some extent, without removing it from the metallic nanoparticles. In one embodiment, the vehicle comprises (or predominantly consists of) one or more polar components (solvents) such as, e.g., a protic solvent, or one or more aprotic, non-polar components, or a mixture thereof. The vehicle, in an embodiment, is a solvent selected from the group consisting of alcohols, polyols, amines, amides, esters, acids, ketones, ethers, water, saturated hydrocarbons, unsaturated hydrocarbons, and mixtures thereof.

Where the features of the invention are printed, formed or created through direct-write printing, such as ink-jet printing e.g., thermal, piezo-electric or continuous ink jet printing, or digital printing, the vehicle is preferably selected to effectively work with direct-write printing tool(s), such as, e.g., an ink-jet head, a digital head, and cartridges, particularly in terms of viscosity and surface tension of the ink composition.

In a preferred aspect, for piezo-electric ink jet inks, the vehicle comprises a mixture of at least two solvents, optionally at least two organic solvents, e.g., a mixture of at least three organic solvents, or at least four organic solvents. The use of more than one solvent is preferred because it allows, inter alia, to adjust various properties of a composition simultaneously (e.g., viscosity, surface tension, contact angle with intended substrate etc.) and to bring all of these properties as close to the optimum values as possible. In one embodiment, the vehicle comprises a mixture of ethylene glycol, ethanol and glycerol. Non-limiting examples of vehicles are disclosed in, e.g., U.S. Pat. Nos. 5,853,470; 5,679,724; 5,725,647; 4,877,451; 5,837,045 and 5,837,041, the entire disclosures of which are incorporated by reference herein.

For thermal ink jet inks, the vehicle preferably comprises a mixture of at least two solvents, optionally at least two organic solvents, e.g., a mixture of at least three organic solvents, or at least four organic solvents. The use of more than one solvent is preferred because it allows, inter alia, to adjust various properties of a composition simultaneously (e.g., viscosity, surface tension, contact angle with intended substrate etc.) and to bring all of these properties as close to the optimum values as possible—particularly so that the first and second inks, respectively, are well-suited for deposition onto the first and second regions, respectively. Preferably, for thermal ink jet printing applications, the vehicle comprises water, optionally with one or more other vehicles. In one embodiment, the vehicle comprises a mixture of propylene glycol and water.

In a preferred embodiment, particularly for thermal ink jet printing applications, the vehicle comprises water. For example, the vehicle optionally comprises at least 30 wt. % water, at least 40 wt. % water, at least 50 wt. % water, at least 60 wt. % water, or at least 70 wt. % water, based on the total weight of the vehicle.

It is desirable to also take into account the requirements, if any, imposed by the deposition tool (e.g., in terms of viscosity and surface tension of the ink) and the surface characteristics (e.g., acidity, hydrophilicity or hydrophobicity) of the intended substrate in selecting the vehicle of choice. Although the desired ink viscosity may depend greatly on the specific deposition tool implemented, inks used to form the features of the present invention, particularly those intended for ink-jet printing with a piezo head, preferably have a viscosity (measured at 20° C.) that is not lower than about 2 centipoise (cP), e.g., not lower than about 12 cP, or not lower than about 15 cP, and optionally not higher than about 50 cP, e.g., not higher than about 40 cP, not higher than about 30 cP, or not higher than about 25 cP. In one embodiment, the ink has a viscosity (measured at 20° C.) that is greater than about 0.5 cP, e.g., greater than about 1.0 cP, or greater than about 1.3 cP, and less than about 10 cP, e.g., less than about 7.5 cP, less than about 5 cP, or less than about 4 cP.

The vehicle preferably provides the inks with a surface tension (measured at 20° C.) ranging from about 10 to about 60 dynes/cm, e.g., from about 10 to about 50 dynes/cm or from about 10 to about 40 dynes/cm.

The inks, e.g., thermal or piezo-electric ink jet inks or digital inks, in an embodiment can further comprise one or more additives, such as, but not limited to, adhesion promoters, rheology modifiers, surfactants, wetting angle modifiers, humectants, crystallization inhibitors, binders, and the like. The inks optionally further comprise a protective coating material such as a lacquer, polymer or a varnish. Such additives are fully described in co-pending U.S. patent application Ser. No. 11/331,233, previously incorporated herein by reference. Other ink formulations are provided in co-pending U.S. patent application Ser. No. 11/331,185, filed Jan. 13, 2006, the entirety of which is incorporated herein by reference.

A preferred additive for inclusion in either or both the first ink and/or the second ink includes surfactants. The amount and type of surfactant may be carefully controlled so as to provide first and/or second inks that are well-suited for deposition on the first and second regions, respectively, of the substrate. The types of surfactant(s) that may be included in the first and/or second ink may vary widely. Some non-limiting examples of preferred surfactants for use in this embodiment of the present invention include fluoronated surfactants, such as FLUORAD® (3M), ZONYL® (duPont); non-ionic surfactants such as TERGITOL®, SURFYNOL®, or siloxanes; and ionic surfactants. Other surfactants suitable for inclusion in the first and/or second inks are listed in U.S. Provisional Patent Application Ser. Nos. 60/643,577 filed Jan. 14, 2005, 60/643,629 filed Jan. 14, 2005, and 60/643,578 filed Jan. 14, 2005, the entireties of which are incorporated herein by reference, and in co-pending Non-Provisional U.S.

patent application Ser. Nos. 11/331,211 filed Jan. 13, 2006, 11/331,238 filed Jan. 13, 2006, and 11/331,230 filed Jan. 13, 2006, the entireties of which are incorporated herein by reference.

Multi-Layered Reflective Features

In another aspect, the present invention is directed toward a reflective feature comprising a substrate having a first surface; a first coating disposed on the first surface and having a second surface; and a reflective element having a third surface and comprising nanoparticles, preferably metallic nanoparticles, disposed, at least in part, on the second surface. The first surface may exhibit a wide range of surface characteristics in terms of porosity, hydrophilicity/hydrophobicity, acidity, etc. The primary purpose of the first coating is to planarize and/or reduce the porosity of the underlying substrate. It has been discovered that by planarizing and/or reducing the porosity of the substrate with the first coating, the reflectivity of the subsequently formed reflective element (preferably comprising metallic nanoparticles) is greater than it would be in the absence of the first coating. That is, the reflective feature preferably exhibits enhanced reflectivity relative to the reflectivity of the reflective feature in the absence of the first coating.

In one embodiment, the substrate comprises a first surface comprising two regions having different surface characteristics, and the first coating covers at least a portion of both regions so as to provide a uniform (second) surface covering at least a portion of both regions. Subsequently, a single ink may then be applied, e.g., printed, onto the uniform (second) surface and over the two regions so as to form a reflective element that spans both regions notwithstanding the different surface characteristics of the two regions. In this embodiment, rather than providing separate first and second inks for forming first and second reflective elements, respectively, as described above with reference to FIGS. 1-4, the coating is formed of a single material that is capable of adhering to both regions, and a single ink is then applied, e.g., printed, directly on the first coating and over both regions.

The first coating preferably has a porosity less than the porosity of the substrate and the first surface of the substrate. In one embodiment, the first coating comprises a material selected from the group consisting of varnishes, offset varnishes, dry offset varnishes, shellacs, latexes and polymers. The invention, however, is not limited to first coatings comprising these materials, as the first coating may comprise any material that lowers the porosity or which can planarize the first surface of the substrate. As the reflective element may be at least partially semitransparent, a portion of the first coating may be viewable through the reflective element. Optionally, the first coating comprises a colorant. By way of non-limiting examples, the colorant may be a dye or pigment. Utilizing a colorant affects the appearance of the reflective feature by changing the apparent color thereof. The color of the substrate when viewed through a first coating comprising a colorant may differ from the color of the substrate viewed through the first coating in the absence of a colorant. Additionally, the presence of the colorant in the first coating may modify the apparent color of the nanoparticles contained in the reflective element that is disposed on top of the first coating. For example, if a yellow colorant is contained in the first coating, and the reflective element comprises silver nanoparticles, the overall reflective feature may exhibit a gold metallic luster, rather than the silver native color of silver nanoparticles.

In one embodiment, the nanoparticles in the reflective element comprise metallic nanoparticles, as fully described above. By way of non-limiting examples, the metallic nanoparticles may comprise a metal selected from the group consisting of silver, gold, zinc, tin, copper, platinum, and palladium, and alloys thereof. Optionally, a majority of the metallic nanoparticles are necked with at least one adjacent metallic nanoparticle. Optionally, the average distance between adjacent metallic particles is less than about 700 nm, e.g., less than about 400 nm, less than about 200 nm, less than about 100 nm, less than about 30 nm, less than about 10 nm, or less than about 1 nm. Optionally, the metallic nanoparticles have an average particle size of less than about 200 nm, e.g., less than about 150 nm, less than about 100 nm, less than about 75 nm or less than about 50 nm. Preferably, the metallic nanoparticles have an average particle size of from about 5 nm to about 100 nm. In another embodiment, the nanoparticles comprise phosphorescent nanoparticles.

In one embodiment, the reflective feature further comprises a second coating having a fourth surface disposed at least in part on the third surface. By way of non-limiting examples, the second coating may comprise material selected from the group consisting of varnishes, offset varnishes, dry offset varnishes, shellacs, latexes and polymers. Preferably, the second coating is transparent. As used herein, the term "transparent" means capable of allowing light to pass therethrough, e.g., through a translucent layer. The primary purpose of the second coating is to protect the underlying layers from, for example, moisture, and everyday wear-and-tear. Additionally, the second coating may enhance the reflectivity of the reflective feature if, for example, the fourth surface possesses specular reflectance. Optionally, the second coating further comprises a colorant, e.g., a dye, pigment or phosphor, which modifies the color or photoluminescence of the feature.

Figure 7:
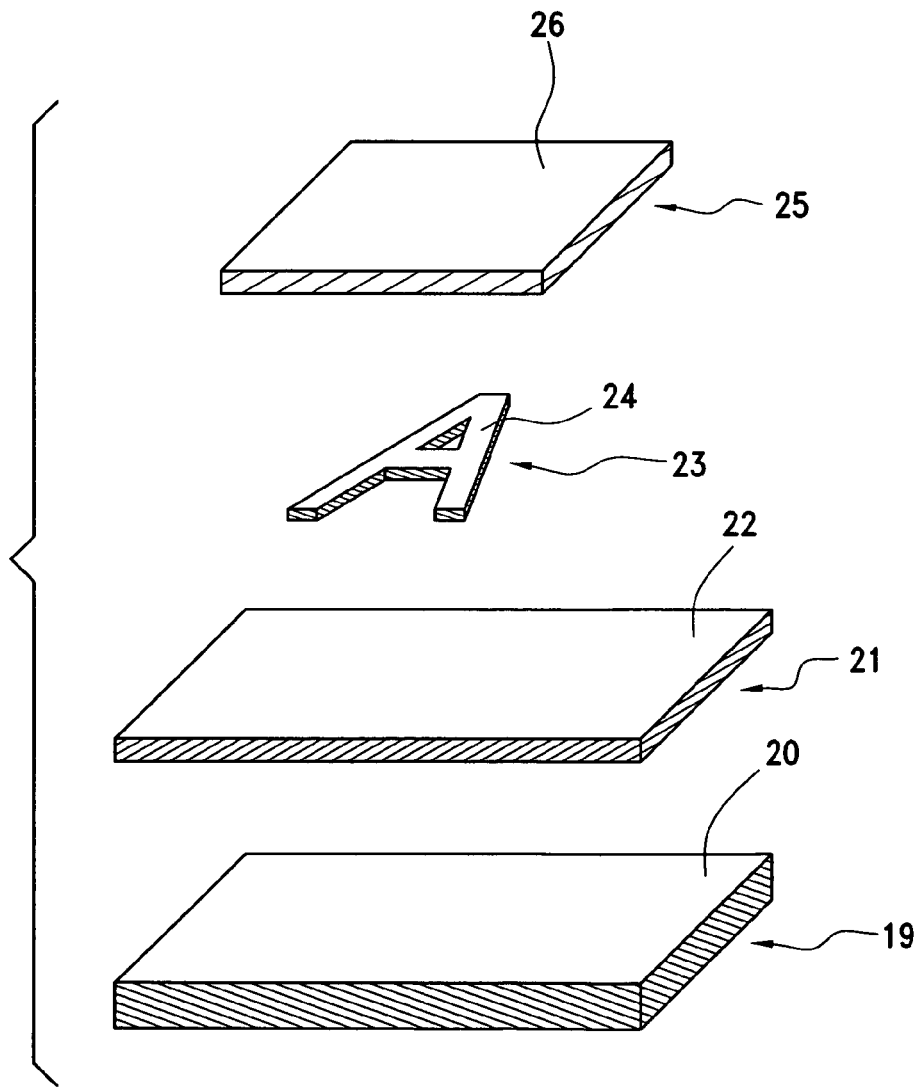
FIG. 7 illustrates an exploded view of a multi-layered feature according to another embodiment of the present invention.
Figure 8:
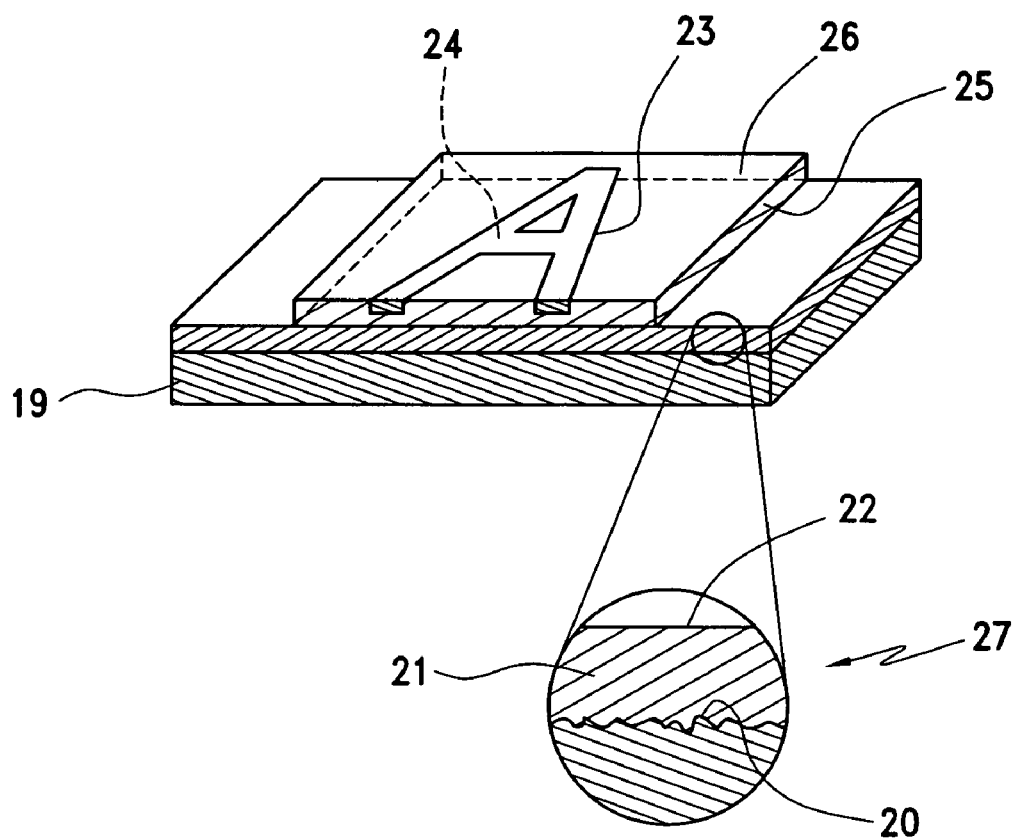
FIG. 8 illustrates a non-exploded view of the feature of FIG. 7.

FIG. 7 illustrates an exploded view of a multi-layered structure of a feature according to this embodiment of the invention, and FIG. 8 illustrates a non-exploded view of the same feature. FIGS. 7 and 8 illustrate a substrate 19 having first surface 20. First surface 20 may be substantially porous or comprise a rough surface on a microscopic level, the surface comprising multiple peaks and valleys, as shown in inset 27. A first coating, which comprises a second surface 22, is disposed on the first surface 20. As shown in inset 27, the second surface 22 preferably is less porous than the first surface 20 and/or acts to planarize substrate 19. A reflective element 23, which has a third surface 24, preferably comprising nanoparticles, e.g., metallic nanoparticles, preferably reflective metallic nanoparticles, is disposed on second surface 22. The reduced porosity and/or more planar nature of the second surface relative to the first surface 20 causes the nanoparticles in the reflective element 23, to be retained on the second surface, thereby concentrating the nanoparticles in a single plane and enhancing reflectivity. FIGS. 7 and 8 also illustrate optional second coating 25, which comprises fourth surface 26, disposed on second surface 22 of first coating 21 as well as on top of third surface 24 of reflective element 23. The second coating 25 acts to protect the reflective element 23 as well as provide enhanced reflectivity to the overall reflective feature.

Preferably, the reflective element is highly reflective. In one embodiment, the reflective element comprises a reflective layer. The reflective layer optionally is at least partially semitransparent. As used herein, the term "semitransparent" means capable of allowing at least some light to pass therethrough, e.g., through openings and/or through a translucent layer, while optionally absorbing a portion of the light. The reflective layer may also be continuous or non-continuous.

In another embodiment, the reflective element comprises a plurality of reflective images, e.g., a plurality of reflective microimages having an average largest dimension of less than about 0.5 mm, e.g., less than about 0.4 mm, less than about 0.3 mm, less than about 0.2 mm, or less than about 0.1 mm. Optionally, at least one microimage comprises variable data.

In one embodiment, an image is disposed on at least one of the first surface or the second surface, and at least a portion of the image is viewable through the reflective element when viewed at a first angle relative to the third surface, and at least a portion of the image is at least partially obscured when viewed from a second angle relative to the third surface. In this embodiment, therefore, the reflective element at least partially obscures the image, depending on the viewing angle. Optionally, the second angle is about 180° minus the angle of incident light, relative to the third surface. By way of non-limiting examples, the image may be formed by direct write printing, intaglio printing, gravure printing, lithographic printing, and flexographic printing, and, by way of non-limiting examples, the image may be a black and white image, a color image, a hologram, a watermark, and a UV fluorescent image. Optionally, the image is in the form of text or a serial number.

In other embodiments, the invention includes the first coating and the reflective element but not the second coating. In another embodiment, the invention includes the reflective element and the second coating disposed thereon, but not the first coating.

In one aspect, the invention relates to processes for forming the above-described multi-layered reflective features, one process comprising the steps of: providing a substrate having a first surface; forming, e.g., printing, optionally through a direct write printing process, e.g., a piezo-electric, thermal, drop-on-demand or continuous ink jet printing process, a first coating on the first surface, the first coating having a second surface; and forming, e.g., printing, optionally through a direct write printing process, e.g., a piezo-electric, thermal, drop-on-demand or continuous ink jet printing process, a reflective element on the second surface, the reflective element having a third surface comprising nanoparticles, preferably metallic nanoparticles. In one embodiment, the reflective element formed comprises a reflective layer that is at least partially semitransparent. The reflective layer may be continuous or non-continuous. Preferably, the first coating formed renders the reflective feature formed more reflective than it would be in the absence of the first coating.

Optionally, the nanoparticles employed in the process of the invention comprise metallic nanoparticles. Optionally, a majority of the metallic nanoparticles in the formed reflective element are necked with at least one adjacent metallic nanoparticle. By way of non-limiting examples, the metallic nanoparticles may comprise a metal selected from the group consisting of silver, gold, zinc, tin, copper, platinum, and palladium, and alloys thereof.

In one embodiment, the step of the forming the first coating comprises depositing a first ink onto the first surface and treating the deposited first ink under conditions effective to form the first coating. The first ink may comprise, for example, a material selected from the group consisting of a varnish, an offset varnish, a dry offset varnish, a shellac, latex, and a polymer. In other embodiments, the first ink comprises a lacquer, an enamel, a glass, a glass/metal composite, or polymer, which may be applied (optionally printed). Other non-limiting exemplary substances useful for inclusion in the first ink include lacquers, fluorosilicates, fluorinated polymers (e.g., Zonyl products), shellac (or other similar clear coat technologies), acrylates, UV curable acrylates, polyurethanes, etc., or a combination thereof. The first ink optionally is deposited on the first surface by a printing process selected from the group consisting of direct write printing (e.g., ink jet (e.g., piezo-electric, thermal, drop-on-demand or continuous ink jet printing) or digital printing), intaglio printing, gravure printing, offset printing, lithographic printing and flexographic printing processes. Preferably, the depositing comprises direct write printing (e.g., ink jet (e.g., piezo-electric, thermal, drop-on-demand or continuous ink jet printing) or digital printing) the first ink onto the first surface. In one embodiment, one or more dyes or pigments are included to the first ink and provide color to the first coating and ultimately formed feature. See Ernest W. Flick, *Printing Ink and Overprint Varnish Formulations, Recent Developments* (Noyes Publications 1991) (ISBN 0-8155-1259-7), and Ernest W. Flick, *Printing Ink and Overprint Varnish Formulations*, Second Edition (Noyes Publications 1999) (ISBN 0-8155-1440-9), the entireties of which are incorporated herein by reference, or an overview of various coating formulations that may be employed for the first ink. The treating of the deposited first ink preferably comprises drying, optionally with heating and/or application of UV radiation to the deposited first ink. Some specific preferred first ink compositions for forming the first coating include RJE A8070 lacquer medium cvec12414 from Cavalier Inks and Coatings (Richmond, Va.); CK-49HG-1 and CK-1250 from Cork Industries Inc. (Folcroft, Pa.); and NiCoat (noncurl 8020) from Gans Ink and Supply Co. (Los Angeles, Calif.).

In another embodiment, the step of forming the reflective element comprises depositing a second ink onto the second surface and treating the deposited second ink under conditions effective to form the reflective element. The composition and properties of the second ink may be as described above with reference to the inks used to form the reflective elements of the other reflective features of the present invention. Optionally, the depositing comprises direct write printing, e.g., a piezo-electric, thermal, drop-on-demand or continuous ink jet printing, the second ink onto the second surface. Optionally, the treating comprises allowing the second ink to dry, heating the deposited second ink and/or applying UV radiation to the deposited second ink. In another embodiment, the treating comprises applying UV radiation to the deposited second ink.

In one embodiment, the process further comprises the step of forming a second coating on the third surface, the second coating having a fourth surface. Optionally, the second coating is transparent. In one embodiment, the step of the forming the second coating comprises depositing a third ink onto the second surface and treating the deposited third ink under conditions effective to form the second coating. The third ink may comprise, for example, a material selected from the group consisting of a varnish, an offset varnish, a dry offset varnish, a shellac, latex, and a polymer. In other embodiments, the third ink comprises a lacquer, an enamel, a glass, a glass/metal composite, or polymer, which may be applied (optionally printed). Other non-limiting exemplary substances useful for inclusion in the third ink include lacquers, fluorosilicates, fluorinated polymers (e.g., Zonyl products), shellac (or other similar clear coat technologies), acrylates, UV curable acrylates, polyurethanes, etc., or a combination thereof. The third ink optionally is deposited on the second surface by a printing process selected from the group consisting of direct write printing (e.g., ink jet (e.g., piezo-electric, thermal, drop-on-demand or continuous ink jet printing) or digital printing), intaglio printing, gravure printing, offset printing, lithographic printing and flexographic printing processes. Preferably, the depositing comprises direct write printing (e.g., ink jet (e.g., piezo-electric, thermal, drop-on-demand or continuous ink jet printing) or digital printing) the third ink onto the second surface. In one embodiment, one or more dyes or pigments are included to the third ink and provide color to the second coating and ultimately formed feature. See Ernest W. Flick, *Printing Ink and Overprint Varnish Formulations, Recent Developments* (Noyes Publications 1991) (ISBN 0-8155-1259-7), and Ernest W. Flick, *Printing Ink and Overprint Varnish Formulations*, Second Edition (Noyes Publications 1999) (ISBN 0-8155-1440-9), the entireties of which are incorporated herein by reference, or an overview of various coating formulations that may be employed for the third ink. The treating of the deposited third ink preferably comprises drying, optionally with heating and/or application of UV radiation to the deposited third ink. Some specific preferred third ink compositions for forming the second coating include RJE A8070 lacquer medium cvec12414 from Cavalier Inks and Coatings (Richmond, Va.); CK-49HG-1 and CK-1250 from Cork Industries Inc. (Folcroft, Pa.); and NiCoat (noncurl 8020) from Gans Ink and Supply Co. (Los Angeles, Calif.).

In one embodiment, at least one of the first surface or the second surface has an image disposed thereon. In this embodiment, at least a portion of the image preferably is viewable through the reflective element when viewed at a first angle relative to the third surface, and at least a portion of the image is at least partially obscured when viewed from a second angle relative to the third surface. The reflective element formed by this process, therefore, at least partially obscures the image, depending on the viewing angle. Optionally, the second angle is about 180° minus the angle of incident light, relative to the third surface. By way of non-limiting examples, the image may be formed from a printing process selected from the group consisting of direct write printing, intaglio printing, gravure printing, lithographic printing, and flexographic printing. By way of non-limiting examples, the image may be selected from the group consisting of a black and white image, a color image, a hologram, a watermark, a UV fluorescent image, text, and a serial number.

In another embodiment, the reflective element formed comprises a plurality of reflective images. In a related embodiment, the reflective element formed comprises a plurality of reflective microimages, wherein the plurality of reflective microimages has an average largest dimension of less than about 0.5 mm. Optionally, at least one microimage comprises variable data.

In one aspect, the present invention relates to a reflective feature comprising a substrate, a reflective element comprising metallic nanoparticles, and an overcoat comprising a colorant. The overcoat optionally comprises a material selected from the group consisting of a material selected from the group consisting of a varnish, an offset varnish, a dry offset varnish, a shellac, latex, and a polymer. By way of non-limiting examples, the colorant may be a dye or pigment. The overcoat comprising the colorant may have the effect of changing the color of the reflective element and/or the substrate. For example, a reflective element comprising metallic nanoparticles that appear silver in the absence of a colorant, may appear gold if the overcoat comprises a colorant. In a preferred embodiment, the overcoat is transparent. Although a transparent overcoat allows light to pass through such that the reflective element remains visible, the overcoat still may create the effect of changing the apparent color of the reflective element. In addition to affecting the apparent color of the reflective element, the overcoat may have the synergistic effect of protecting the reflective element, and/or increasing the reflectivity of the reflective element.

In another aspect, the present invention relates to a process for forming a reflective feature, the process comprising the steps of: providing a substrate; forming a reflective element comprising nanoparticles, preferably metallic nanoparticles, on the substrate; and forming an overcoat, optionally comprising a colorant, on the reflective element. Optionally, the step of forming the reflective element, preferably comprising the metallic nanoparticles, comprises direct write printing an ink comprising the nanoparticles onto the substrate. Optionally, the step of forming the overcoat comprises direct write printing, e.g., ink jet printing, an ink, optionally comprising the colorant, onto the substrate and/or the reflective element. Optionally, the overcoat comprising a colorant is transparent. The colorant employed in this process may be selected from virtually any pigment or dye that is compatible with a direct write printing process.

EXAMPLES

Example 1

Lacquer Undercoat to Form Highly Reflective Feature

A multi-layer reflective feature comprising a substrate, an undercoat and a reflective feature was formed. The substrate comprised glossy Epson photopaper, which was made substantially non-porous by forming a non-porous lacquer undercoat on the surface of the paper. The coating was formed by applying RJE A8070 Lacquer Medium cvec 12414 (Cavalier Inks and Coatings, Richmond, Va.) onto the Epson photopaper and allowing it to dry.

An ink comprising silver nanoparticles (average particle size=20-80 nm) and rhodamine dye was ink jet printed onto the coated substrate. The ink was ink jet printed onto the lacquer-coated paper utilizing a Hewlett-Packard thermal ink jet printing head (Model HP45A cartridge) and allowed to dry. The printing pattern comprised a repeating pattern of microprinted numbers (2 Pt. font size or smaller). The ink had the formulation shown in Table 1, below.

TABLE 1

| SILVER NANOPARTICLE/RHODAMINE INK JET INK FORMULATION | |
|---|---|
| Ingredient | Weight Percent |
| Rhodamine | 4.3 |
| Silver Nanoparticles | 9.5 |
| Glycerol | 16.4 |
| Ethanol | 44.0 |
| Ethylene Glycol | 25.8 |

Visibly, the feature was surprisingly reflective and unexpectedly exhibited a color shift between a dark red metallic color and a green metallic color as the viewing angle changed.

Example 2

Lacquer Undercoat to Form Highly Reflective Feature

A multi-layer reflective feature comprising a substrate, an undercoat and a reflective feature was formed. The substrate comprised glossy Epson photopaper, which was made substantially non-porous by forming a non-porous lacquer undercoat on the surface of the paper. The coating was formed by applying RJE A8070 Lacquer Medium cvec 12414 (Cavalier Inks and Coatings, Richmond, Va.) onto the Epson photopaper and allowing it to dry.

An ink comprising silver nanoparticles (average particle size=20-80 nm) and basic fuchsin dye was ink jet printed onto the coated substrate. The ink was ink jet printed onto the lacquer-coated paper utilizing a Hewlett-Packard thermal ink jet printing head (Model HP45A cartridge) and allowed to dry. The printing pattern comprised a repeating pattern of microprinted numbers (2 Pt. font size or smaller). The ink had the formulation shown in Table 2, below.

TABLE 2

SILVER NANOPARTICLE/BASIC FUCHSIN INK JET INK FORMULATION

| Ingredient | Weight Percent |
| --- | --- |
| Basic Fuchsin | 4.3 |
| Silver Nanoparticles | 9.5 |
| Glycerol | 16.4 |
| Ethanol | 44.0 |
| Ethylene Glycol | 25.8 |

Visibly, the feature was surprisingly reflective and unexpectedly exhibited a color shift between a dark red metallic color and a green metallic color as the viewing angle changed.

Example 3

Lacquer Overcoat to Form Durable Reflective Feature

A reflective feature was formed by ink jet printing an ink comprising silver nanoparticles (average particle size=20-80 nm) and treating the first layer to form a first coating, and then forming a second layer comprising a colored lacquer on top of the first layer. The substrate comprised (uncoated) glossy Epson photopaper.

The ink had the formulation shown in Table 3, below.

TABLE 3

SILVER NANOPARTICLE INK JET INK FORMULATION

| Ingredient | Weight Percent |
| --- | --- |
| Silver Nanoparticles | 10.0 |
| Glycerol | 17.0 |
| Ethanol | 46.0 |
| Ethylene Glycol | 27.0 |

The ink was deposited on the substrate utilizing a Hewlett-Packard thermal ink jet printing head (Model HP45A cartridge) and allowed to dry. The printing pattern comprised a repeating pattern of microprinted numbers (2 Pt. font size). After drying, a colored lacquer coating was deposited on the surface of the paper with a draw bar and allowed to dry. The colored coating was formed by adding rhodamine dye to RJE A8070 Lacquer Medium cvec 12414 (Cavalier Inks and Coatings, Richmond, Va.) to obtain a 5 wt % rhodamine concentration, based on the total weight of the colored lacquer coating. The reflective feature formed in Example 3 thus had two layers, a first silver nanoparticle layer, and a colored lacquer overcoat disposed thereon. The feature was surprisingly reflective and appeared to have a lustrous red metallic color. The feature was also surprisingly durable, exhibiting a rating of 5 on the ASTM D-5264D92 rub test.

While the present invention has been described with reference to exemplary embodiments, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials, and embodiments, the invention is not intended to be limited to the particulars disclosed herein. Instead, the invention extends to all functionally equivalent structures, methods, and uses, such as are within the scope of the appended claims.

We claim:

1. A reflective feature, comprising: a substrate having a first region and a second region, the first and second regions having different surface characteristics; a first reflective element on the first region; and a second reflective element on the second region, wherein the first reflective element is more adherent to the first region than the second reflective element would be to the first region if the second reflective element were on the first region, and wherein the first reflective element comprises metallic nanoparticles consisting of only a metal, only a mixture of metals, or only an alloy of metals.

2. The reflective feature of claim 1, wherein the second reflective element is more adherent to the second region than the first reflective element would be to the second region if the first reflective element were on the second region.

3. The reflective feature of claim 1, wherein the first reflective element is exclusively on the first region.

4. The reflective feature of claim 1, wherein the substrate further comprises a third region, and the reflective feature further comprises a third reflective element on the third region, wherein the third reflective element is more adherent to the third region than the first reflective element or the second reflective element would be to the third region if the first reflective element or the second reflective were on the third region.

5. The reflective feature of claim 1, wherein a majority of the metallic nanoparticles are necked with at least one adjacent metallic nanoparticle.

6. The reflective feature of claim 5, wherein the second reflective element comprises metallic nanoparticles.

7. The reflective feature of claim 1, wherein the first region comprises a composition selected from the group consisting of foil, film, UV-coated lacquer, paper, coated paper, polymer, and printed paper.

8. The reflective feature of claim 1, wherein the second region comprises a composition selected from the group consisting of foil, film, UV-coated lacquer, paper, coated paper, and printed paper.

9. The reflective feature of claim 1, wherein the first reflective element and the second reflective element form a continuous graphical feature that spans at least a part of the first region and at least a part of the second region.

10. The reflective feature of claim 1, wherein at least one of the first reflective element and/or the second reflective element comprises variable information.

11. The reflective feature of claim 1, wherein the substrate is selected from the group consisting of a banknote, a brand authentication tag, a tax stamp, an ID document, an alcoholic bottle, and a tobacco product.

12. The reflective feature of claim 1, wherein the first region comprises a first undercoat.

13. The reflective feature of claim 12, wherein the first undercoat enhances the reflectivity of the first reflective element on the first region.

14. The reflective feature of claim 12, wherein the second region comprises a second undercoat.

15. The reflective feature of claim 13, wherein the second undercoat enhances the reflectivity of the second reflective element on the second region.

16. The reflective feature of claim 1, further comprising a first overcoat on the first reflective element.

17. The reflective feature of claim 16, wherein the first overcoat enhances the reflectivity of the first reflective element.

18. The reflective feature of claim 16, wherein the first overcoat enhances the durability of the first reflective element.

19. The reflective feature of claim 16, wherein the first overcoat is further on the second reflective element.

20. The reflective feature of claim 19, wherein the first overcoat enhances the reflectivity of the second reflective element.

21. The reflective feature of claim 19, wherein the first overcoat enhances the durability of the second reflective element.

22. The reflective feature of claim 16, further comprising a second overcoat on the second reflective element.

23. The reflective feature of claim 22, wherein the second overcoat enhances the reflectivity of the second reflective element.

24. The reflective feature of claim 22, wherein the second overcoat enhances the durability of the second reflective element.

25. The reflective feature of claim 1, wherein the first region is more porous than the second region.

26. The reflective feature of claim 1, wherein the first region is more hydrophobic than the second region.

27. A process for forming a reflective feature of claim 1, the process comprising providing a substrate comprising a first region and a second region; direct write printing a first ink onto the first region to form a first reflective element; and direct write printing a second ink onto the second region to form a second reflective element, wherein the first ink is more adherent to the first region than the second ink would be to the first region if the second region were on the first region.

28. The process of claim 27, wherein the second ink is more adherent to the second region than the first ink would be to the second region if the first ink were on the second region.

29. The process of claim 27, further comprising direct write printing a third ink onto a third substrate surface to form a third reflective element, wherein the substrate further comprises the third substrate surface, and wherein the third ink is more adherent to the third region than the first ink or the second ink would be to the third region if the first ink or the second ink were on the third region.

30. The process of claim 27, wherein the first region comprises a composition selected from the group consisting of foil, film, UV-coated lacquer, paper, polymer, coated paper, and printed paper.

31. The process of claim 30, wherein the second region comprises a composition selected from the group consisting of foil, film, UV-coated lacquer, paper, coated paper, and printed paper.

32. The process of claim 27, wherein the first reflective element and the second reflective element form a continuous graphical feature that spans at least a part of the first region and at least a part of the second region.

33. The process of claim 27, wherein at least one of the first reflective element and the second reflective element comprises variable information.

34. The process of claim 27, wherein the substrate is selected from the group consisting of a banknote, a brand authentication tag, a tax stamp, an ID document, an alcoholic bottle, and a tobacco product.

35. The process of claim 27, wherein the first region comprises a first undercoat.

36. The process of claim 35, wherein the first undercoat enhances the reflectivity of the first reflective element on the first region.

37. The process of claim 35, wherein the second region comprises a second undercoat.

38. The process of claim 37, wherein the second undercoat enhances the reflectivity of the second reflective element on the second region.

39. The process of claim 27, wherein a first overcoat is formed on the first reflective element.

40. The process of claim 39, wherein the first overcoat enhances the reflectivity of the first reflective element.

41. The process of claim 39, wherein the first overcoat enhances the durability of the first reflective element.

42. The process of claim 39, wherein the first overcoat is further formed on the second reflective element.

43. The process of claim 42, wherein the first overcoat enhances the reflectivity of the second reflective element.

44. The process of claim 42, wherein the first overcoat enhances the durability of the second reflective element.

45. The process of claim 39, wherein a second overcoat is formed on the second reflective element.

46. The process of claim 45, wherein the second overcoat enhances the reflectivity of the second reflective element.

47. The process of claim 45, wherein the second overcoat enhances the durability of the second reflective element.

48. The process of claim 27, wherein the first region is more porous than the second region.

49. The process of claim 27, wherein the first region is more hydrophobic than the second region.

* * * * *